US012342126B1

(12) United States Patent
Titovich

(10) Patent No.: US 12,342,126 B1
(45) Date of Patent: Jun. 24, 2025

(54) EXTREMELY DIRECTIONAL MICROPHONE

(71) Applicant: The United States of America, as represented by the Secretary of the Navy, Arlington, VA (US)

(72) Inventor: Alexey S. Titovich, Poolesville, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 255 days.

(21) Appl. No.: 18/144,206

(22) Filed: May 7, 2023

Related U.S. Application Data

(60) Provisional application No. 63/339,556, filed on May 9, 2022.

(51) Int. Cl.
*H04R 1/34* (2006.01)
*H04R 1/22* (2006.01)
*H04R 1/28* (2006.01)

(52) U.S. Cl.
CPC ............. *H04R 1/342* (2013.01); *H04R 1/222* (2013.01); *H04R 1/2876* (2013.01)

(58) Field of Classification Search
CPC ........ H04R 1/326; H04R 1/342; H04R 1/222; H04R 1/2876
See application file for complete search history.

(56) References Cited

U.S. PATENT DOCUMENTS 2,210,415 A * 8/1940 Kellogg .................... G01S 1/72 381/189
4,401,859 A * 8/1983 Watson .................. H04R 1/342 381/357

* cited by examiner

*Primary Examiner* — Kile O Blair
(74) *Attorney, Agent, or Firm* — Howard Kaiser

(57) ABSTRACT

An exemplary embodiment of an inventive sound-sensing device includes a rigid hollow cylinder, a rigid end-closure joined at one longitudinal-axial end of the cylinder, a sound-absorbing material at least partially lining the cylinder and the end-closure, and a microphone. Some inventive embodiments additionally include a vibration-absorbing material at least partially lining the cylinder and/or end-closure, which are each made of metal or composite. The end-closure is provided with a sound-reflecting mirror having a circular paraboloid (paraboloid of revolution) three-dimensional shape. The mirror faces the interior of the cylinder, is co-axial with the cylindrical axis, and is characterized by a focal point located on the shared geometric axis and within the interior of the cylinder. The microphone is placed at the mirror's focal point and communicates with suitable electronics. In tandem, the cylinder and the absorbent material encourage the directivity of the inventive sound-sensing device.

20 Claims, 25 Drawing Sheets

EXTREMELY DIRECTIONAL MICROPHONE

CROSS-REFERENCE TO RELATED APPLICATIONS

This patent application claims the benefit of U.S. provisional patent application No. 63/339,556, filed 9 May 2022, hereby incorporated herein by reference, entitled "Extremely Directional Microphone," inventor Alexey S. Titovich.

STATEMENT OF GOVERNMENT INTEREST

The inventorship of the invention described herein includes at least one person who invented the invention in performance of the person's official duties as an employee of the United States Department of the Navy. The invention may be manufactured, used, and licensed by or for the Government of the United States of America for governmental purposes without payment of any royalties thereon or therefor. The Government of the United States of America has ownership rights in the invention.

BACKGROUND OF THE INVENTION

The present invention relates to microphones, more particularly to directional microphones and especially to unidirectional microphones.

A directional microphone is basically a microphone that exhibits greatest sensitivity or sensitivities in one or more particular directions. As distinguished from a directional microphone, an omnidirectional microphone picks up sounds from all directions in a comparable manner or to a comparable degree.

Several kinds of microphones are generally regarded as being directional. For instance, cardioid microphones pick up sounds from the front and sides but not the back. As another example, shotgun microphones rely on interference slits to provide favorable interference-yielding directionality. Early designs of shotgun microphones used numerous tubes of varying lengths to yield the favorable interference and resultant directionality or directionalities. As a further example, an array of microphones can produce a highly directional response when the individual signals are combined appropriately. This microphone arrayal approach is typically referred to as "beamforming," and requires a large number of sensors and other hardware to yield a response.

Although the word "microphone" was first coined by Sir Charles Wheatstone around 1827, it was not until 1916 that the condenser microphone was patented at Bell Laboratories by E. C. Wente; see U.S. Pat. No. 1,333,744, entitled "Telephone Transmitter," issued 16 Mar. 1920. As the television and film industries evolved, microphones with greater directionality were required to complement long focal-length camera lenses. The need for high microphonic directionality continues to this day in many technological applications.

Earliest attempts to effect high directionality in microphones utilized baffled arrays of omnidirectional microphones. Later, placement of an omnidirectional microphone at the focal point of a parabolic reflector somewhat improved directionality and provided signal gain. In the 1930s Western Electric and RCA developed a directional microphone that was fed through a bundle of narrow tubes of varying lengths, with the result that all non-axial components of the propagating waves that arrived at the sensor were attenuated due to incoherent interference. Over the years this tubular concept matured into the design of the interference tube as used in modern shotgun microphones.

SUMMARY OF THE INVENTION

In view of the foregoing, an object of the present invention is to provide a highly directional acoustic sensor.

An exemplary inventive device is a highly directional single-channel microphone device utilizing a line-of-sight waveguide bearing some similarity to a waveguide that may be utilized in a Keplerian reflector-type telescope. A key feature of the present invention is a waveguide that is acoustically reflection-less, thereby preventing off-axis reflected and diffracted fields from contaminating the measurement. An exemplary embodiment of the present invention's very directional acoustic sensing device is more directional than either a parabolic reflector microphone or a shotgun microphone, has a single microphone channel, and does not rely on beamforming.

In accordance with exemplary practice of the present invention, the signal in the desired direction is amplified by a parabolic reflector, which terminates the waveguide and supports a single microphone at its focal point. The resulting directivity index is superior to that of a parabolic reflector microphone. Due to the line-of-sight cone provided by the waveguide, the inventive device is particularly well suited for measuring distant sound. Hence, the present inventor refers to his device as a "macriaphone," which means "far-away sound" in Greek.

An example of an acoustic sensing device according to the present invention includes a rigid tubular structure, at least one absorptive layer, and a microphone. The rigid tubular structure is characterized by a geometric longitudinal axis and an interior space, and includes a cylindrical section, an open axial end, and a closed axial end. The cylindrical section has a cylinder inside and a cylinder outside. The closed axial end has an end outside and an end inside. The end inside has an acoustically reflective parabolic surface that is exposed to the interior space and is centrically aligned with respect to the geometric longitudinal axis. Each absorptive layer is made of sound-absorptive material and/or vibration-absorptive material. At least one absorptive layer at least substantially covers either the cylindrical inside or the cylindrical outside. The microphone is situated in the interior space at a focal point of the acoustically reflective parabolic surface. The focal point is located on the geometrical longitudinal axis. The microphone is capable of receiving sound waves that are focused upon the microphone by the acoustically reflective parabolic surface. A combination including the rigid tubular structure and the at least one absorptive layer promotes directivity of the acoustic sensing device.

The desire for directionality and magnification in the observation of propagating waves did not originate in acoustics, but rather in optics. Jacob Metius is recognized for having developed, in 1608, the first refractor-type telescope, which he called "spyglass." Shortly thereafter Galileo adapted Metius' teachings and constructed his own 38-inch long refractor telescope. In 1616, just seven years after Galileo built his first refractor, Niccolo Zucchi attempted to build a reflecting telescope using a focusing metal reflector.

Early reflector telescopes suffered from blockage, by the observer's head, of most of the incident light. In 1668 Sir Issac Newton placed a smaller flat mirror in the telescope to redirect the focused light to a comfortable viewing position. The loss of intensity due to the spherical mirror aberration in the Newtonian telescope was overcome by James Short, who discovered a way to make a parabolic mirror. Similar to primitive Newtonian telescopes, modern reflector telescopes have a parabolic lens, a secondary mirror, and a tube that holds the eyepiece and absorbs non-axially incident light.

It is scientifically counterintuitive to build a reflector microphone having a tube. This doubtfulness relates to the physical phenomenon known as diffraction. Generally speaking, airborne acoustic interaction with objects at audible frequencies is dominated by diffraction. The present invention uniquely demonstrates a parabolic microphone that is extremely directional by means of a diffraction-less or nearly diffraction-less tube.

The present invention, as exemplarily embodied, encompasses an extremely directional microphone at audible frequencies. An exemplary inventive device includes an omnidirectional or cardioid microphone, a circular parabolic reflector, and a diffraction-less tube. Exemplary inventive practice provides directivity through implementation of a tube and as a consequence of efficiently blocking sound from non-line-of sight-sources, thereby decreasing the spatially integrated noise floor. The present invention's parabolic reflector captures the axially propagating wave and focuses it at the focal point, where the microphone captures it. In summary, the present invention's macriaphone couples the signal gain of the parabolic reflector with a dramatically decreased field of view, to yield a highly directional acoustic sensor.

An exemplary inventive device is operated by pointing it in the direction of interest and monitoring and/or recording the electrical signal. The beam width of the inventive sensor is determined by the tube's aspect ratio. If one is interested in using an inventive device as an acoustic camera, then the distance from the radiating surface determines the area of the surface that is being sampled. Unlike an acoustic beamforming system, an exemplary inventive device has a single sensing microphone. The inventive device is directional at lower frequencies, where shotgun microphones and acoustic beam formers fall short.

The present invention, as exemplarily embodied, is a very directional acoustic sensing device. The inventive device is more directional than a parabolic reflector microphone, is more directional than a shotgun microphone, has a single microphone channel, and does not rely on beamforming. The present invention features, inter alia, a combination including a cylindrical waveguide and an anechoic material, wherein said combination substantially increases the directivity of a parabolic reflector microphone. The present invention can also be embodied as or as part of a device that functions as an acoustic laser (such as may be useful for communications), or a device that functions as an acoustic camera, or a device useful for atmospheric exploration.

As noted hereinabove, the present inventor calls his extremely directional microphone a "macriaphone," borrowing a Greek word meaning "far-away sound." In conceiving his invention, the present inventor uniquely seized upon the premise that certain optical principles may be viable as acoustic principles for purposes of detecting sound in a highly directional manner. Inter alia, exemplary embodiments of the present invention, numerical predictions pertaining to the present invention, and experimental results from a prototype of the present invention, made and tested by the present inventor, are described hereinbelow.

An example of an inventive tubular device includes a rigid tube, one or more acoustic absorption layers on (e.g., around the circumference of) the inside or outside of the rigid tube, and one or more vibration absorption layers on (e.g., around the circumference of) the inside or outside of the rigid tube. Inventive practice is possible wherein there is at least one acoustic absorption layer but no vibration absorption layer, or wherein there is at least one vibration absorption layer but no acoustic absorption layer, or wherein at least one layer is both an acoustic absorption layer and a vibration absorption layer.

Exemplary inventive practice implements at least one sound-absorptive material and/or at least one vibration-absorptive material. Sound-absorptive materials absorb sound energy when encountering sound waves. Generally speaking, sound-absorptive materials are porous or open-celled materials. For instance, the term "acoustic foam" is commonly used to refer to a foam material characterized by acoustic absorption. Polyester foam, polyether foam, and polyether fiber are examples of types of materials that may be useful for absorbing sound. Vibration-absorptive materials remove vibration energy from a structure. Generally speaking, vibration-absorptive materials are dense materials. Elastomers such as natural rubber, butyl rubber, and neoprene are examples of types of materials that may be useful for absorbing vibration. According to some inventive embodiments at least one material is dually absorptive, having properties of both sound absorption and vibration absorption.

BRIEF DESCRIPTION OF THE DRAWINGS

FIG. 1 is a lengthwise depiction of this first inventive example. FIGS. 2 and 3 are partial and enlarged views of FIG. 1. FIG. 4 is a cross-sectional view of FIG. 1.

FIGS. 5 through 8 illustrate a second example of an acoustic sensing device in accordance with the present invention. FIG. 5 is a lengthwise depiction of this second inventive example. FIGS. 6 and 7 are partial and enlarged views of FIG. 5. FIG. 8 is a cross-sectional view of FIG. 5.

FIG. 10 illustrates attenuation of unwanted transmission paths.

DESCRIPTION OF EXEMPLARY EMBODIMENTS OF THE INVENTION

Figure 1:
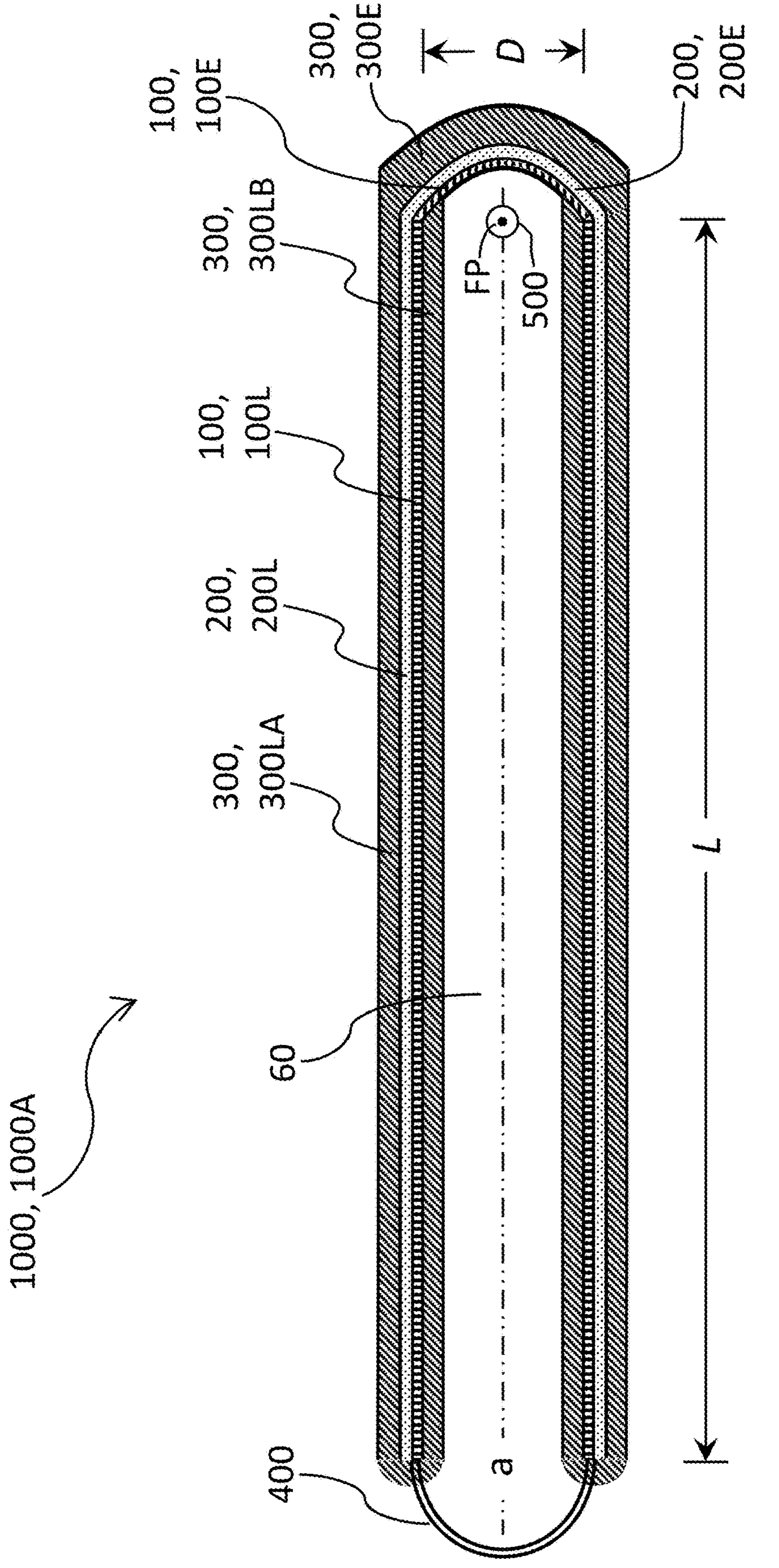
FIGS. 1 through 4 are diagrams illustrating a first example of an acoustic sensing device in accordance with the present invention.

Reference is now made to FIGS. 1 through 8, which illustrate by way of example two modes of practice in accordance with the present invention. Each mode of inventive practice provides for an inventive tubular device 1000 that is closed at one axial-longitudinal end and is operable as a directional microphone.

Inventive tubular device 1000 includes a rigid component 100 (e.g., made of metal or composite), a vibration absorption component 200, an acoustic absorption (e.g., foam) component 300, a wind screen 400, and a microphone 500. Inventive tubular device 1000 is characterized by interior space (e.g., air) 60 and a geometric longitudinal axis a. Rigid component 100 includes a hollow cylindrical section 100L and a curved-end (e.g., concave) section 100E characterized by an acoustically reflective parabolic inside surface 110, which is exposed to interior space 60.

Figure 2:
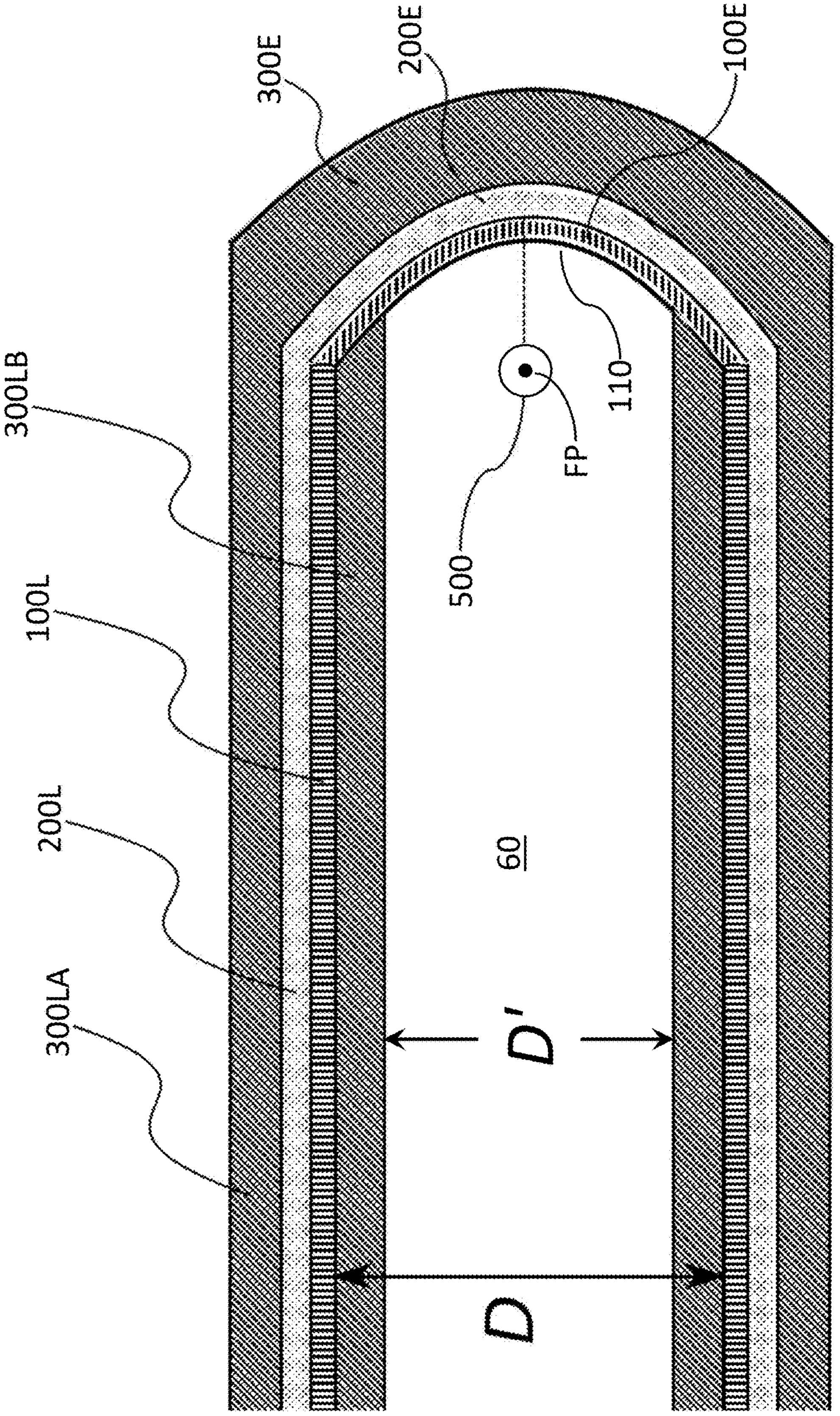
Figure 3:
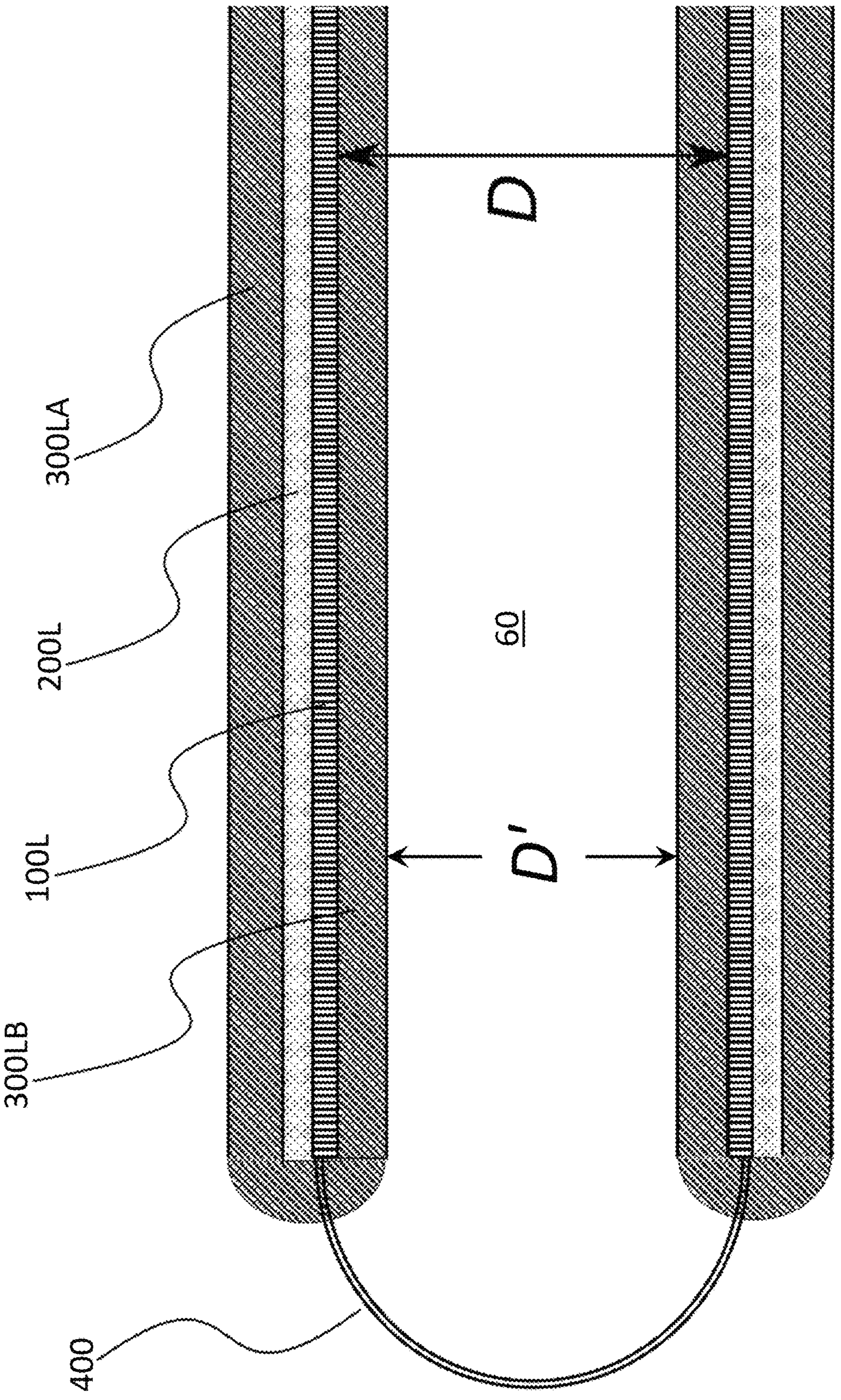
Figure 4:
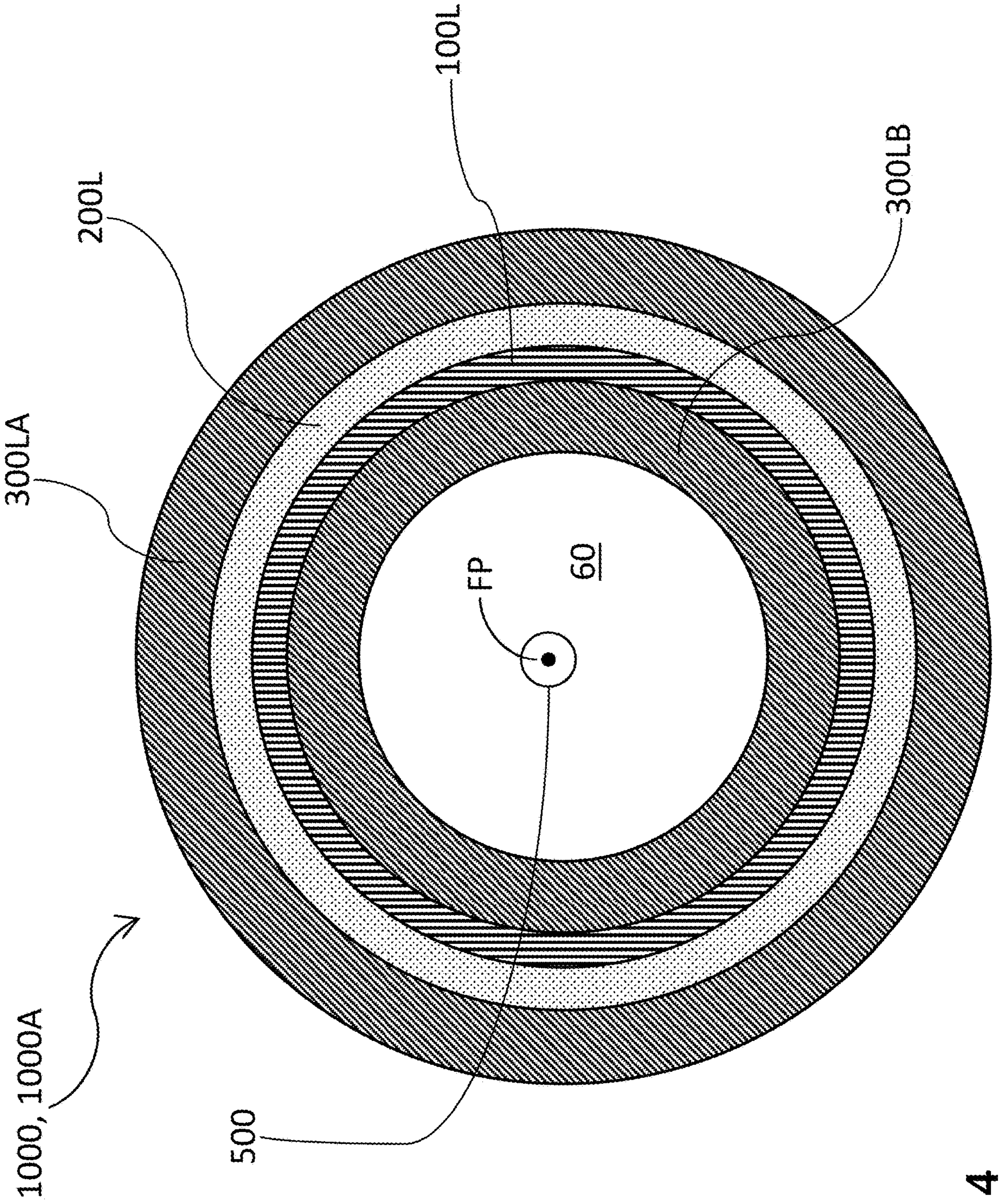
Figure 5:
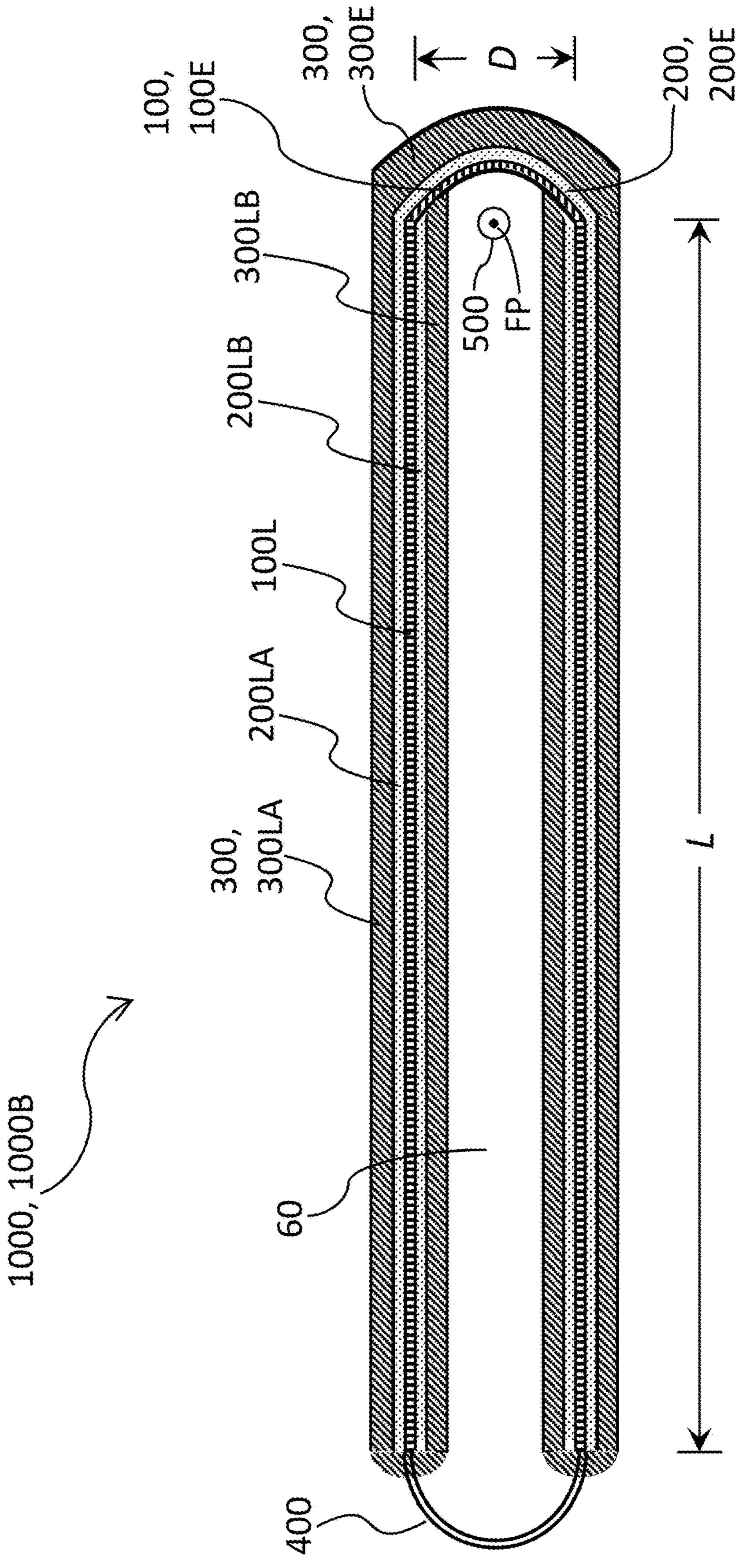
FIGS. 5 through 8 are diagrams similar in view to FIGS. 1 through 4, respectively.

FIGS. 1 through 4 depict an example of an inventive tubular device 1000A. FIGS. 2 and 3 are partial and enlarged views of FIG. 1. FIG. 4 is a cross-sectional view of FIG. 1. As shown in FIGS. 1 through 4, according to a first mode of inventive practice the acoustic foam component 300 includes an outer cylindrical layer 300LA, an inner cylindrical layer 300LB, and a curved-end layer 300E. Vibration-absorptive component 200 includes a cylindrical vibration-absorptive layer 200L and a curved-end vibration-absorptive layer 200E. Rigid hollow cylindrical section 100L is situate between cylindrical vibration-absorptive layer 200L and inner cylindrical acoustic foam layer 300LB. Cylindrical vibration-absorptive layer 200L is situate between outer cylindrical acoustic foam layer 300LA and rigid hollow cylindrical section 100L. Curved-end vibration-absorptive layer 200E is situate between curved-end acoustic foam layer 300E.

Figure 6:
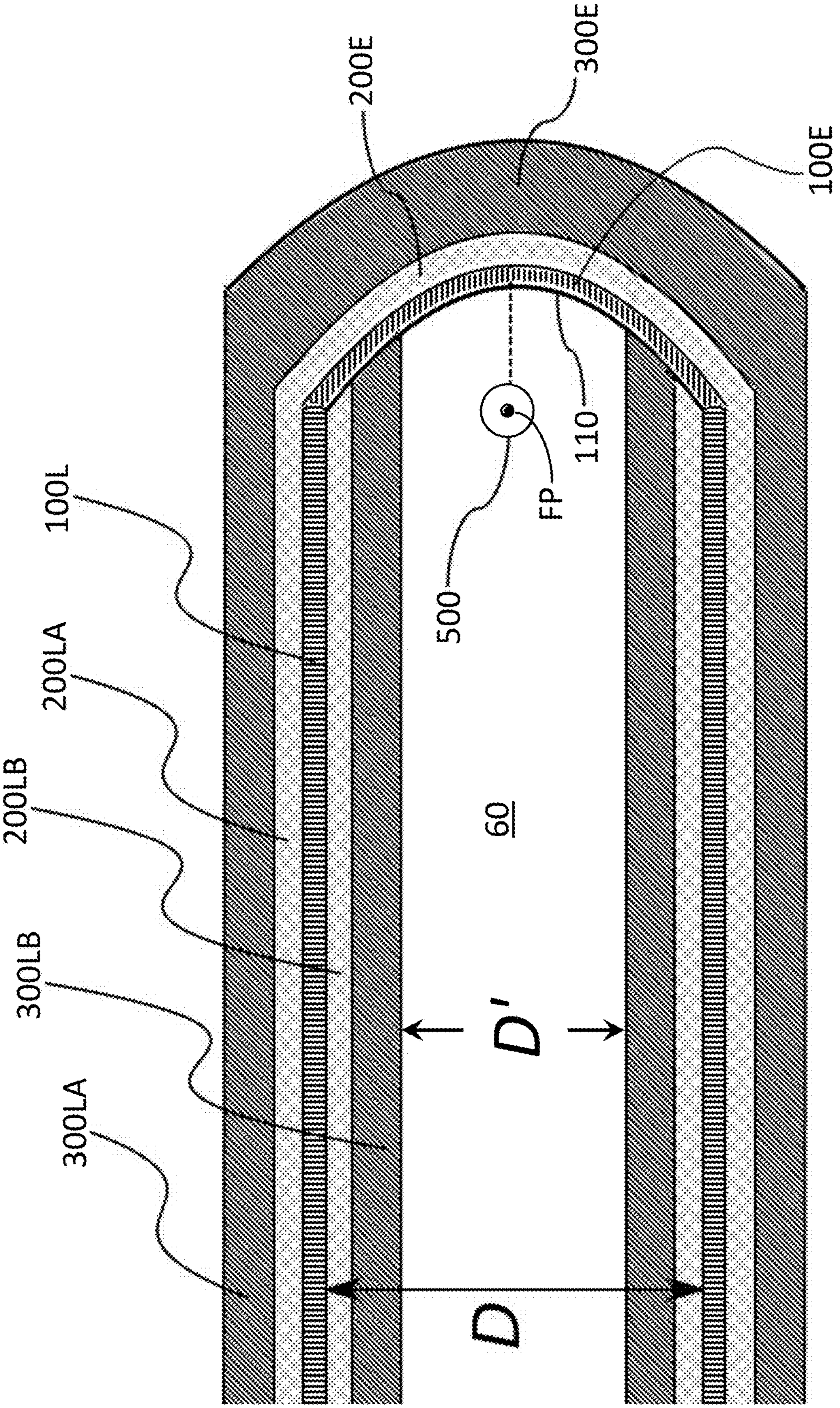
Figure 7:
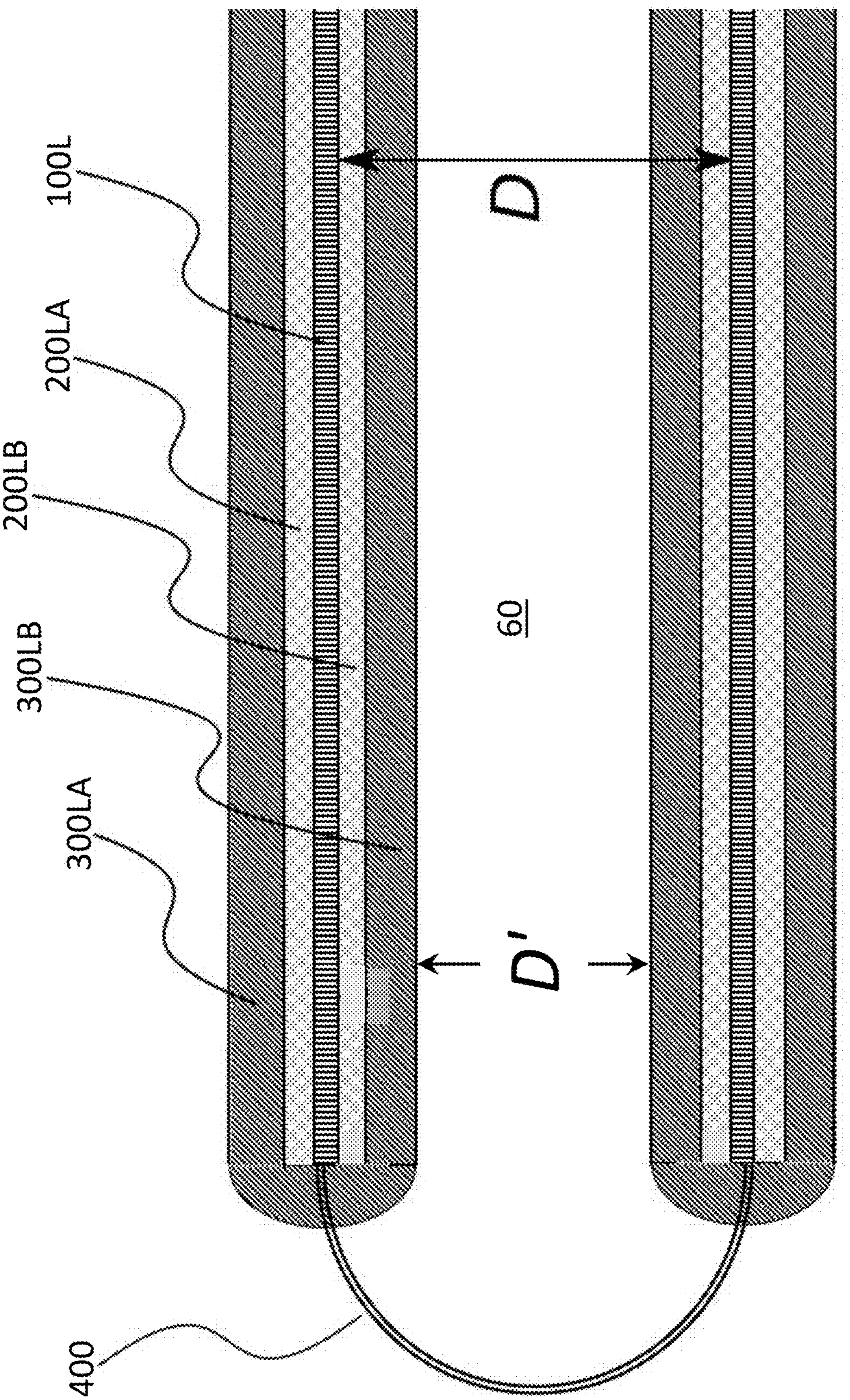
Figure 8:
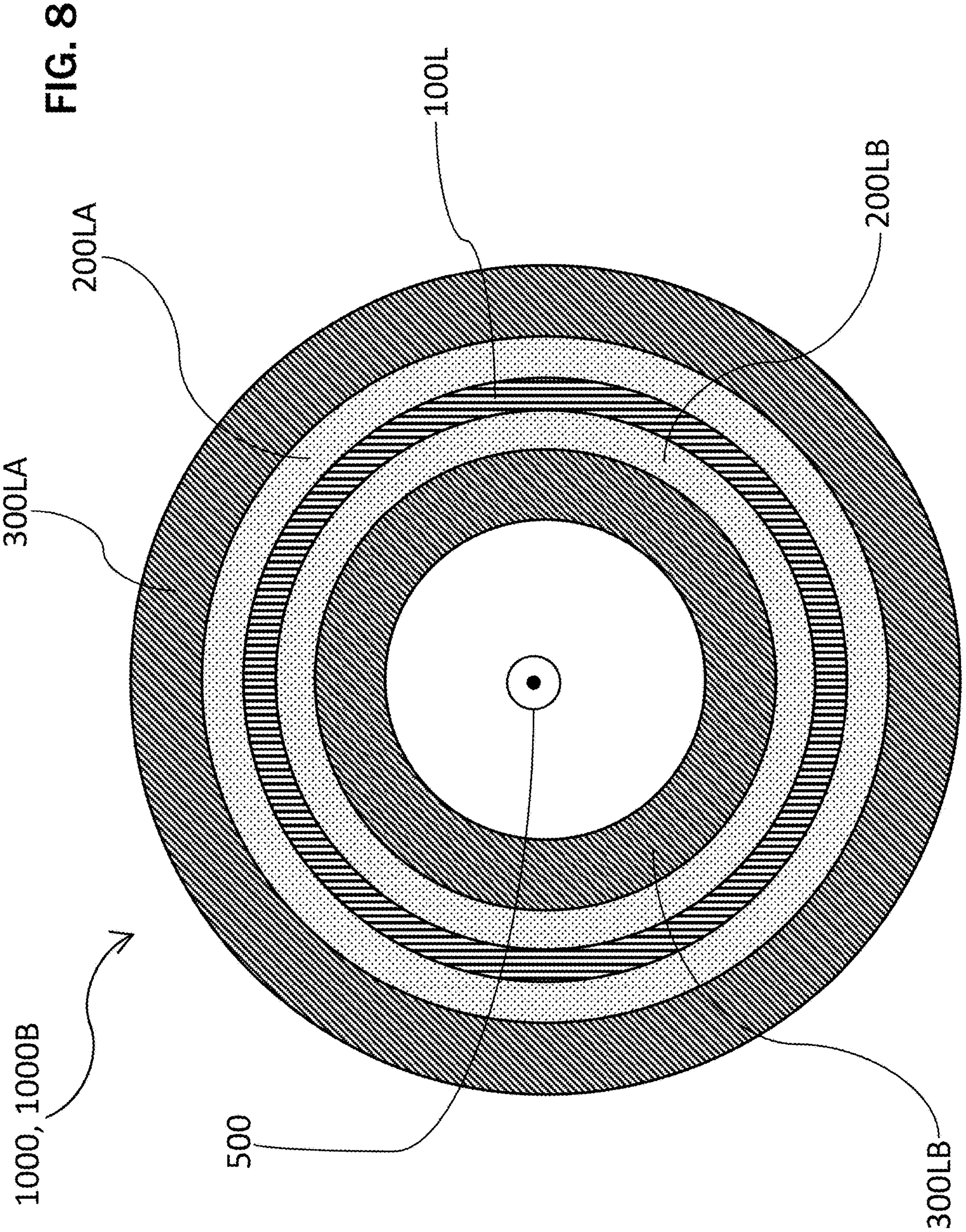

FIGS. 5 through 8 depict an example of an inventive tubular device 1000B. FIGS. 6 and 7 are partial and enlarged views of FIG. 5. FIG. 8 is a cross-sectional view of FIG. 5. Inventive tubular device 1OOOA and inventive tubular device 1000B are same or similar, except for the notable difference that inventive tubular device 1000A includes one cylindrical vibration-absorptive layer, viz., cylindrical layer 200L, whereas inventive tubular device 1000B includes two cylindrical vibration-absorptive layers, viz., outer cylindrical layer 200LA and inner cylindrical layer 200LB. As shown in FIGS. 5 through 8, outer cylindrical vibration-absorptive layer 200LA is situate between outer cylindrical acoustic foam layer 300LA and rigid hollow cylindrical section 1OOL. Inner cylindrical vibration-absorptive layer 200LB is situate between inner cylindrical acoustic foam layer 300LB and rigid hollow cylindrical section 100L.

Structural tube 100 is made from a sturdy material that would preferably be light and very stiff to shift the vibrational response to higher frequencies. The structural tube terminates at the parabolic reflector 110, which as the name suggests must have a very high reflectivity. The outside of the structural components is covered with vibration dampening material 200 in order to decrease signal contamination due to structural vibration. Acoustic foam 300, or like material with high acoustic absorption, covers the entire inventive tubular device 1000 both inside and out, except for the parabolic reflector 110. All waves incident onto the absorbent material 300 will be attenuated, and the signal at the microphone 500 is significantly gained by the parabolic reflector 110. In some applications in may be necessary to add a wind screen 400 to prevent turbulent flow of air from reaching the microphone 500.

Figure 11:
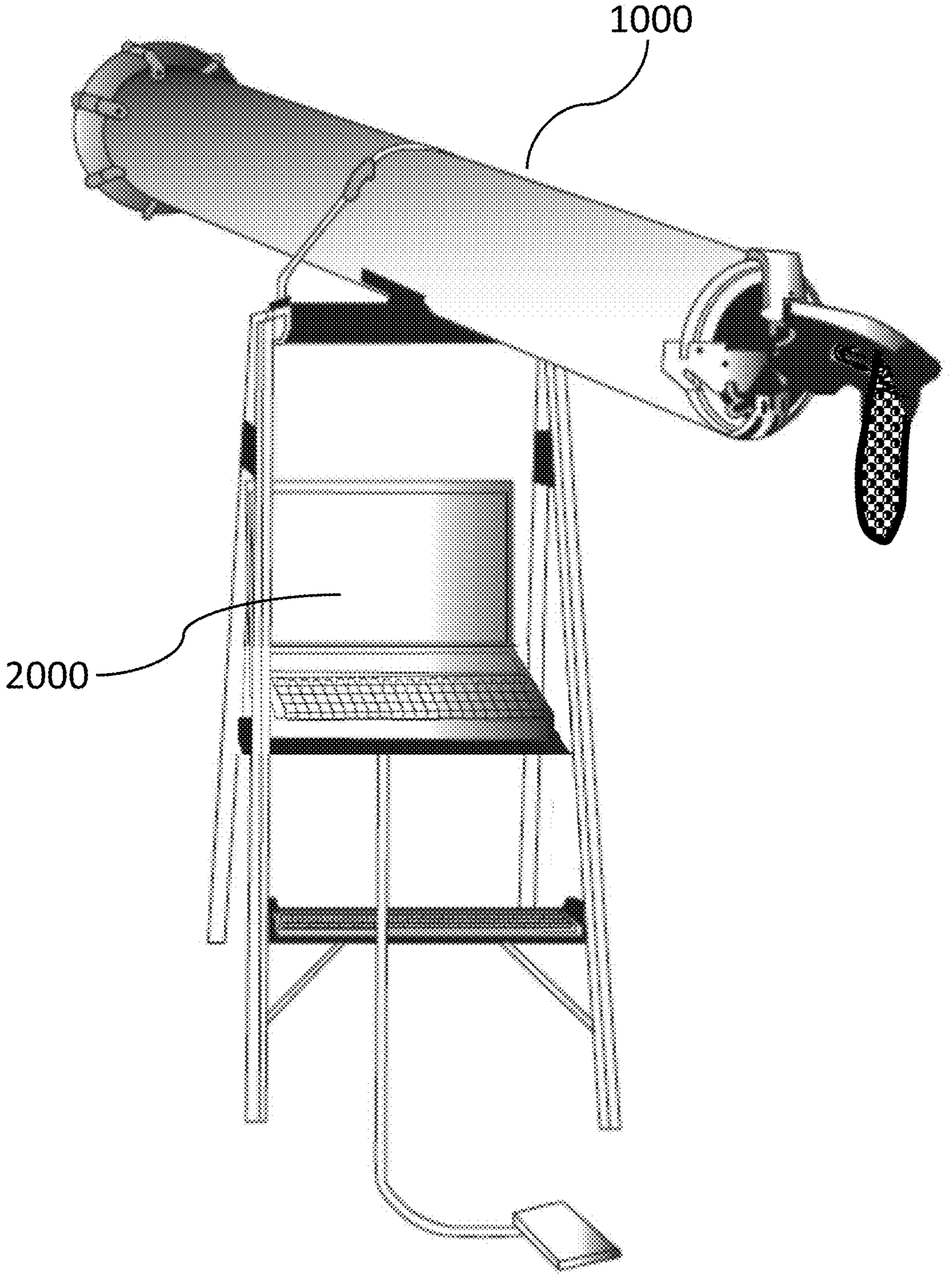
FIG. 11 is a perspective view of a prototypical exemplary inventive apparatus that was made by the present inventor.

FIG. 11 shows an example of an inventive prototype tubular device 1000 that was part of an experimental setup (also including a computer 2000) in accordance with the present invention. The inventive apparatus is somewhat reminiscent of an astronomer's telescope, thus giving rise to the present inventor's description of his macriaphone as "a stargazer's microphone design."

Figure 12:
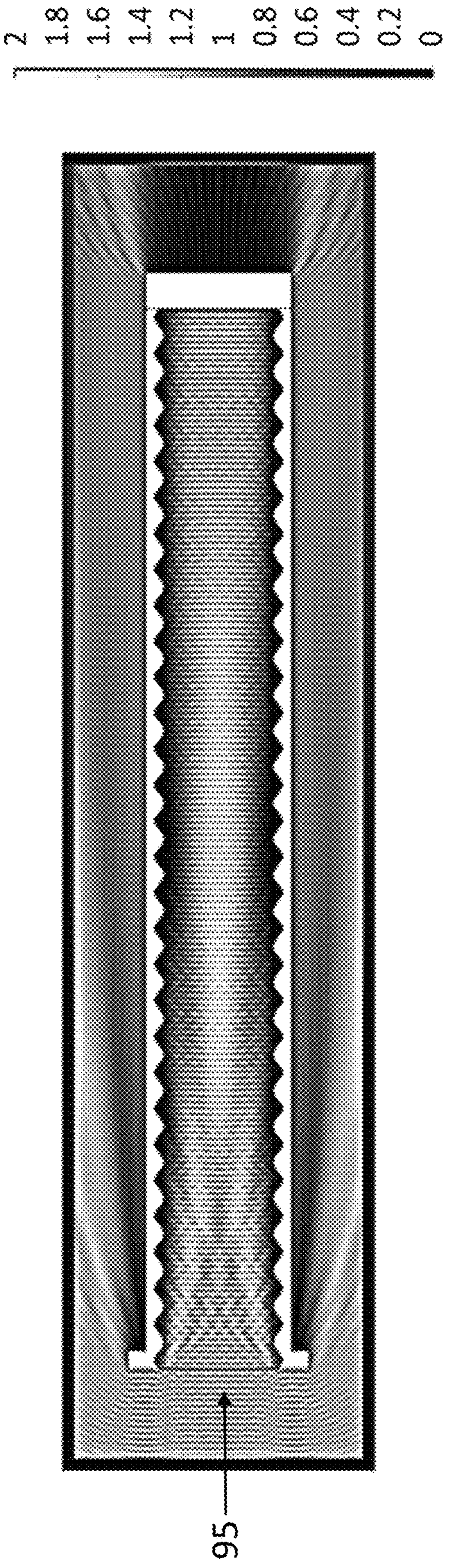
FIGS. 12 through 14 are diagrams illustrating, by way of example, pressure fields in association with an embodiment of an inventive acoustic sensing device.
Figure 13:
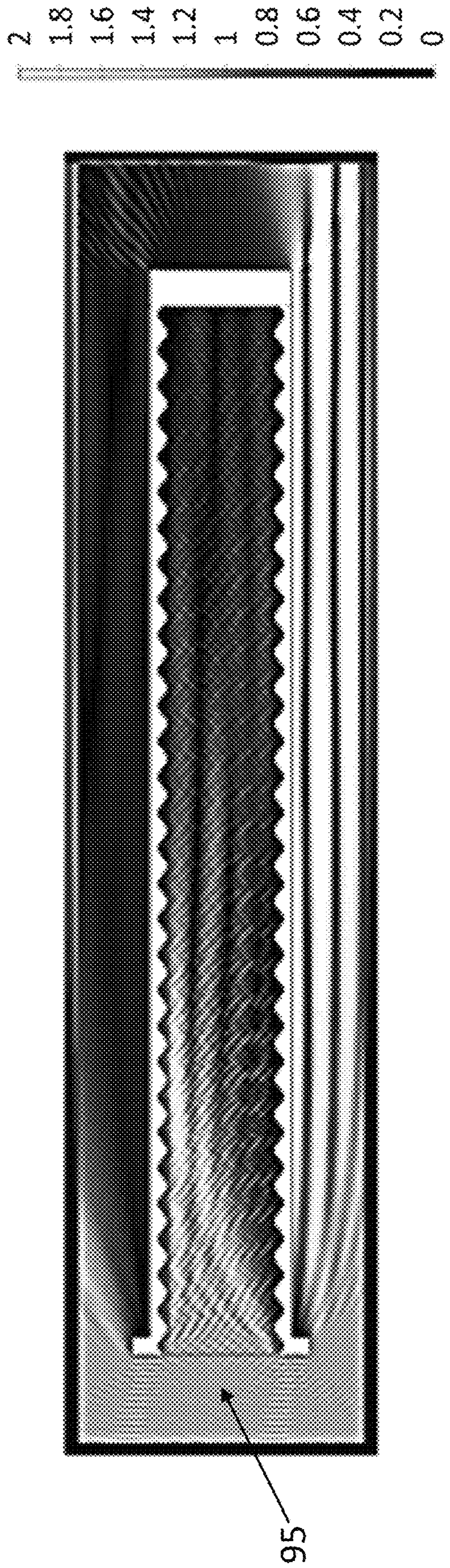
Figure 14:
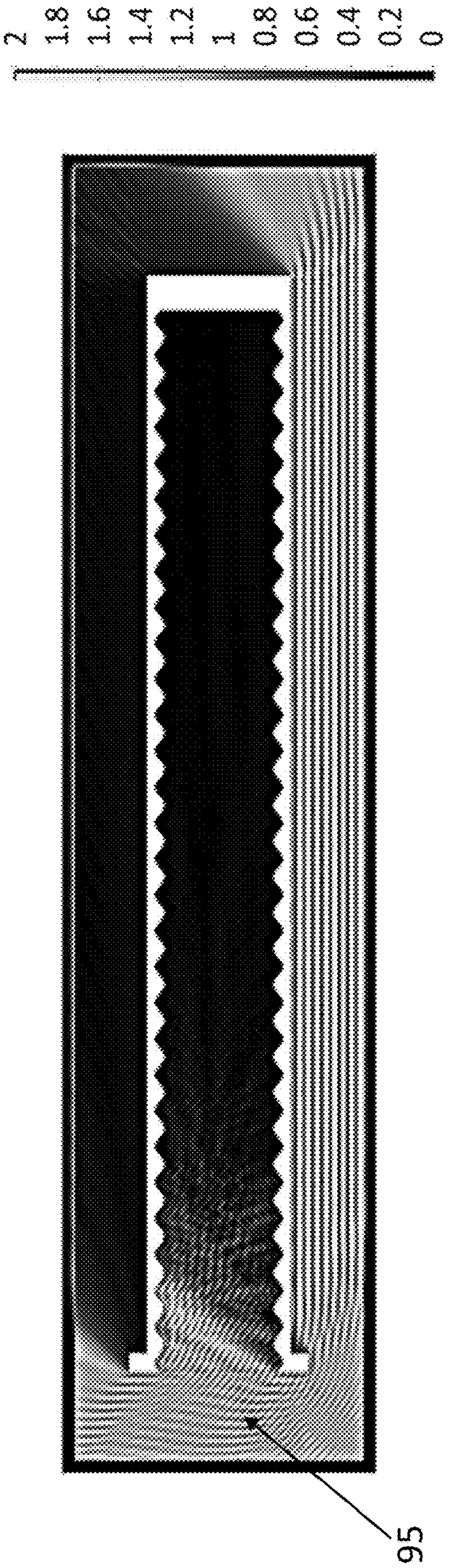
Figure 15:
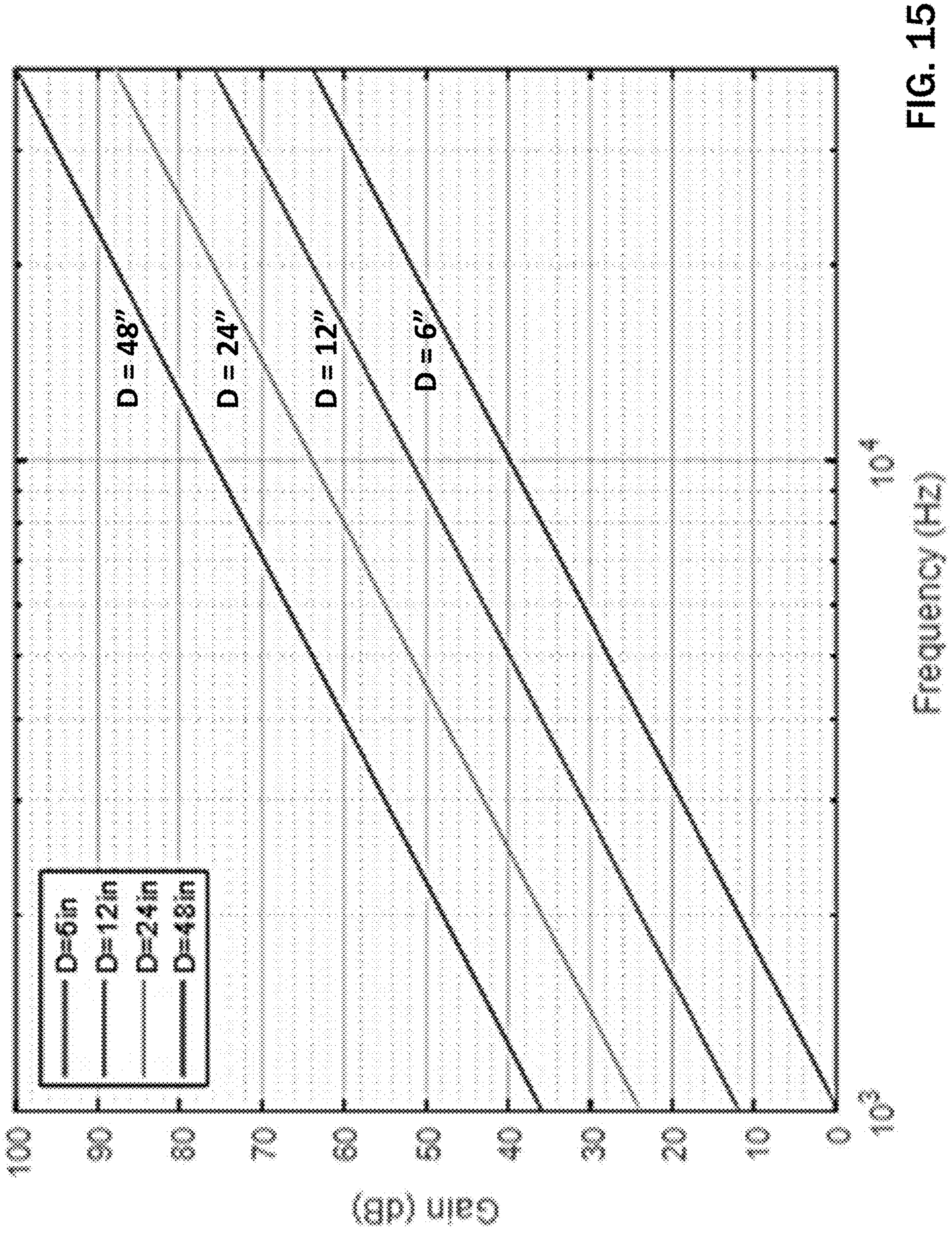
FIG. 15 is a graph illustrating, by way of example, gain versus frequency with respect to various aperture diameters in inventive practice.

FIGS. 12 through 14 show an absolute pressure field for 0, 12.5 and 45 degree incidence, respectively, as indicated in each figure by arrow 95 (kD=55.8, kL=558). As shown by way of example in FIGS. 12 through 14, inventive use of corrugated foam can further increase the diffusivity of the field inside the waveguide. With reference to FIG. 15, the signal gain at the focal point of a parabolic reflector of diameter D is given by $$G = \eta\left(\frac{\pi D}{\lambda}\right)^2,$$

where η is the efficiency associated with manufacturability of a perfect reflector and X is the wavelength of the incident sound. It can also be written in terms of frequency f and sound speed c as $$G = \eta\left(\frac{\pi D f}{c}\right)^2.$$

Assuming an efficiency of 50% and a sound speed of 343 m/s, FIG. 15 shows the expected gain in decibels for several dish apertures D. FIG. 15 illustrates a predicted parabolic reflector gain with an efficiency of 50%.

Sound arriving at the reflector from off-axis does not combine coherently at the reflector. A favorable consequence of using a highly reflective parabolic surface 110, in accordance with the present invention, is its back rejection of sound, especially when coated on the backend with an acoustic absorber 300E. As is customary in the field of optics generally, the surface imperfections should be smaller than $$\frac{\lambda}{12}.$$

The inventive tubular device includes a cylindrical section of length L and diameter D. The solid angle of incident sound in the line of sight of the microphones is given by $$\theta_s = 2\tan^{-1}\left(\frac{D'}{L}\right),$$

which accounts for most of the incident energy. The actual acoustic aperture is D', which is the diameter of the air column. For example, the line-of-sight angle is 11.3, 5.7, and 2.9 degrees for length-to-diameter ratios of 5, 10, and 20, respectively.

Figure 9:
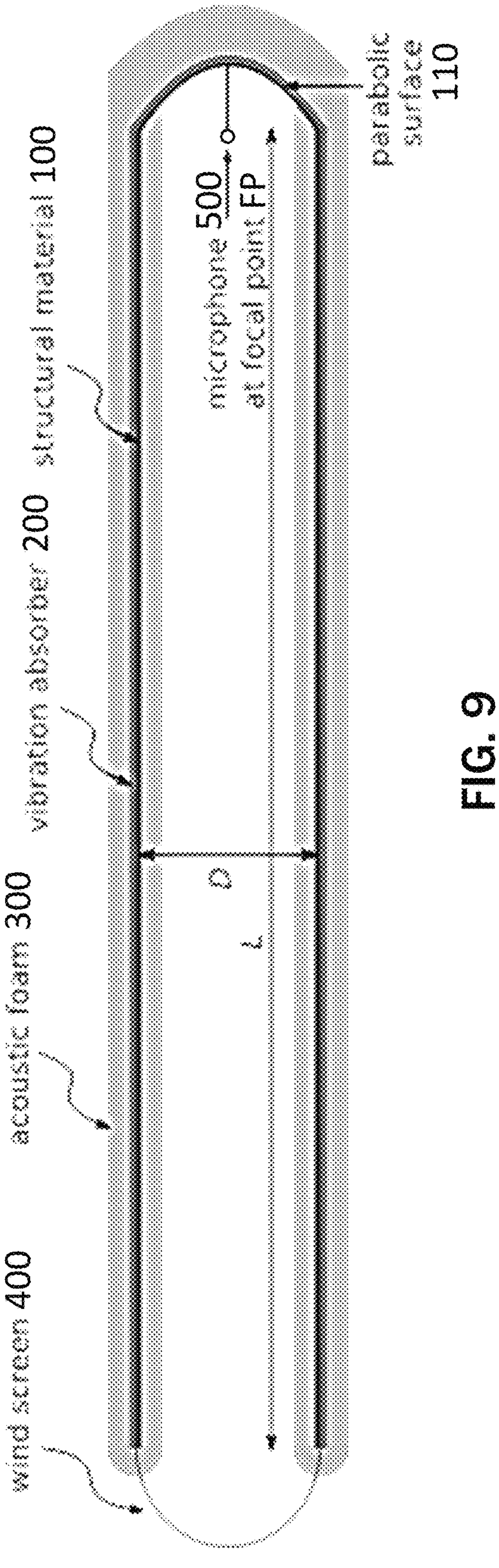
FIGS. 9 and 10 are diagrams, similar in view to FIG. 1, showing an example of an inventive acoustic sensing device similar to that shown in FIGS. 1 through 4.
Figure 10:
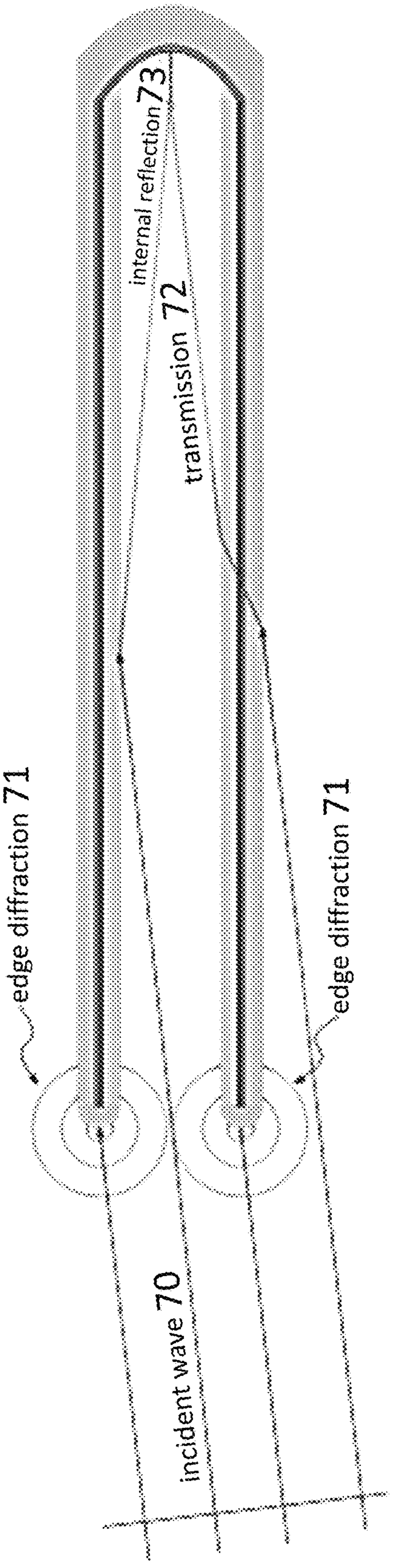

FIGS. 9 and 10 show an inventive embodiment similar to that shown in FIGS. 1 through 4. FIG. 10 illustrates attenuation of unwanted transmission paths. There are three dominant transmission paths of unwanted noise depicted in FIG. 10, viz., internal reflection, transmission through tube, and tube edge diffraction. As shown by way of example in FIG. 10, off-axis incidence is greatly attenuated by the acoustic foam. All three transmission paths can be dealt with by using a sufficiently lossy absorber. According to exemplary inventive practice, one way to achieve a high absorption coefficient is to increase the thickness of the absorbing material until the desired attenuation has been achieved. Another way of increasing the attenuation is to make the inventive tubular device longer, which increases the number of times a wave is reflected off of the internal surfaces prior to reaching the reflector. The result is that waves diffracted by the tube are significantly attenuated and continue to attenuate as they travel down the tube.

Incident acoustic waves as well as transmission through the supporting structure excite vibrations of the inventive tubular device. These vibrations can re-radiate into the tube and raise the effective noise floor of the device. A standard method for dealing with flappy structures is to apply vibration absorbing material 200 to them, such as shown in FIGS. 1 through 10. Note that this absorption material 200 is optimized to attenuate small amplitude vibrations of a stiff structure 100, whereas the acoustic treatment is optimized to attenuate airborne wave incident upon stiff structure 100. According to some inventive embodiments, the inventive tubular device can also be stiffened with axial and radial stiffeners in order to decrease the amplitude of vibration and shift structural modes to higher frequencies, where damping treatments may be more effective.

The relative size between the aperture D and the wavelength $$\lambda = \frac{2\pi}{D}$$

can be significant in inventive practice. A fundamental requirement, in order for the inventive macriaphone to achieve optimal directivity and gain, is for the wavenumber k to satisfy $kD \gg 1$. The effect on the gain of the parabolic reflector is apparent in FIG. 15. As the wavelength decreases towards the size of the diameter, diffraction becomes more pronounced. The only solution for retaining all sensing capabilities at lower frequencies is to increase the diameter. For example, if one desires to use the inventive macriaphone at 100 Hz, then using a kD=10, yields $$D = \frac{10c}{2\pi f} = 5.5 \text{ m} = 17.9 \text{ ft},$$

and a gain of 22 dB. That is comparable in size to the 16-feet diameter Dungeness mirrors constructed in the 1920s to detect aircraft coming over the English Channel.

The present inventor performed computer simulations of particular embodiments of his invention. For instance, as an implementable example of inventive practice, consider an inventive macriaphone of length L=5 ft and outer diameter $D_0$=8 in made of 30 gauge steel. The solid angle for line of sight incidence is $\theta_S$=11.4 deg. The inside of the cylinder is covered with acoustic egg crate foam with maximum thickness of 1 in and 0.5 in peak to peak variation. The assumed properties for the foam were E=(100+15i)kPa, $\rho$=28.1 kg/m$^3$. In order to quantify the directivity of the inventive tube, the present inventor neglected the parabolic dish, replacing it with an acoustically absorptive layer, and investigated the pressure at the microphone location for various angles of incidence.

Figure 16:
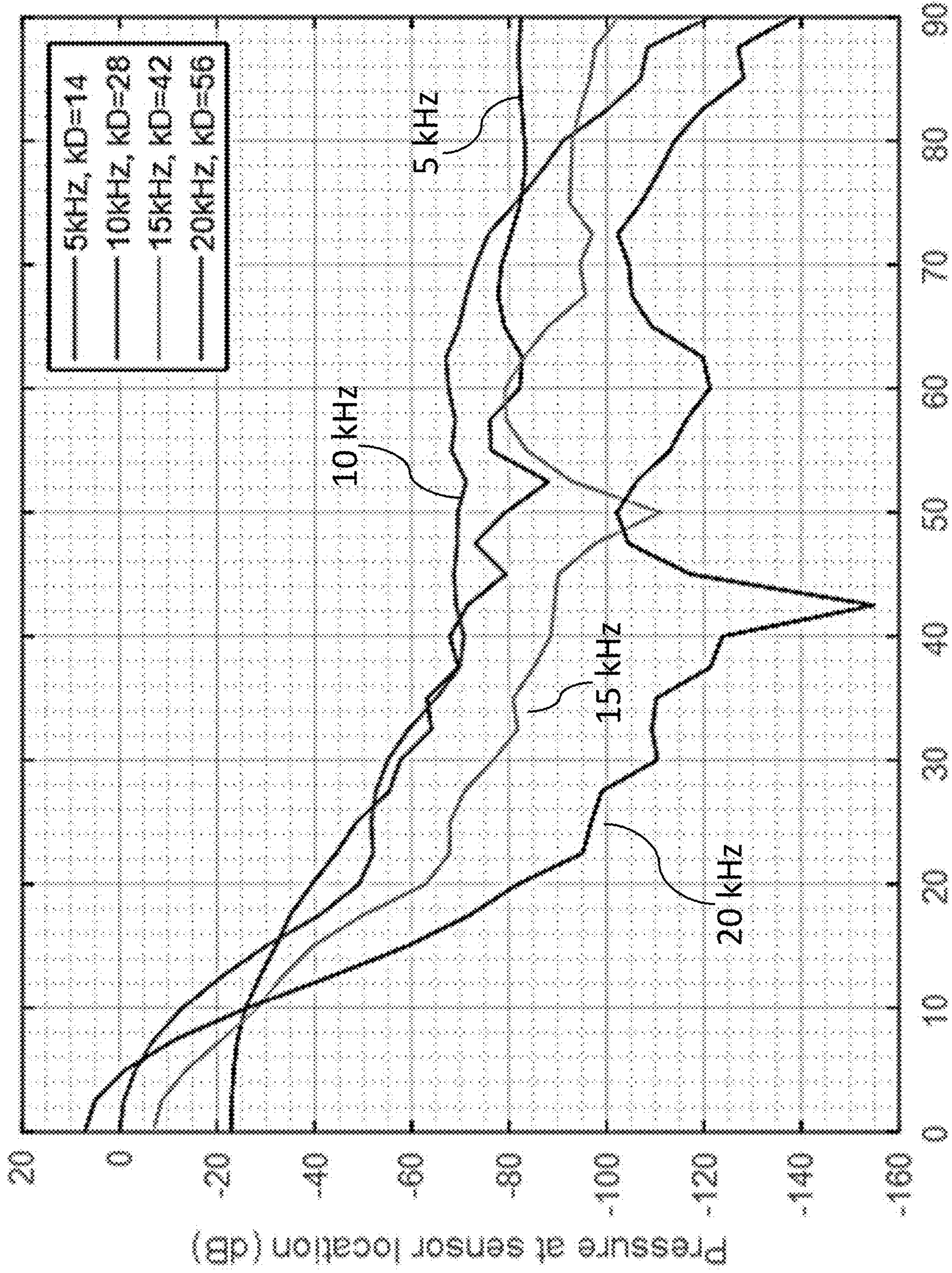
FIG. 16 is a graph illustrating, by way of example, pressure at the location of an inventive acoustic sensing device, versus angle of incidence.

FIG. 10 shows the absolute pressure field for several angles of incidence. As expected, the pressure at the microphone is very directional, even though this simulation was 2D with two planar surfaces rather than a circular cylinder. FIG. 16 shows an example of direct pressure at an inventive sensor for various angles of incidence demonstrating directionality. FIG. 16 illustrates the expected directivity obtained from the COMSOL Multiphysicso software model. This far-field directivity was obtained using the reciprocity principle. It predicts a very directional sensor.

Figure 19:
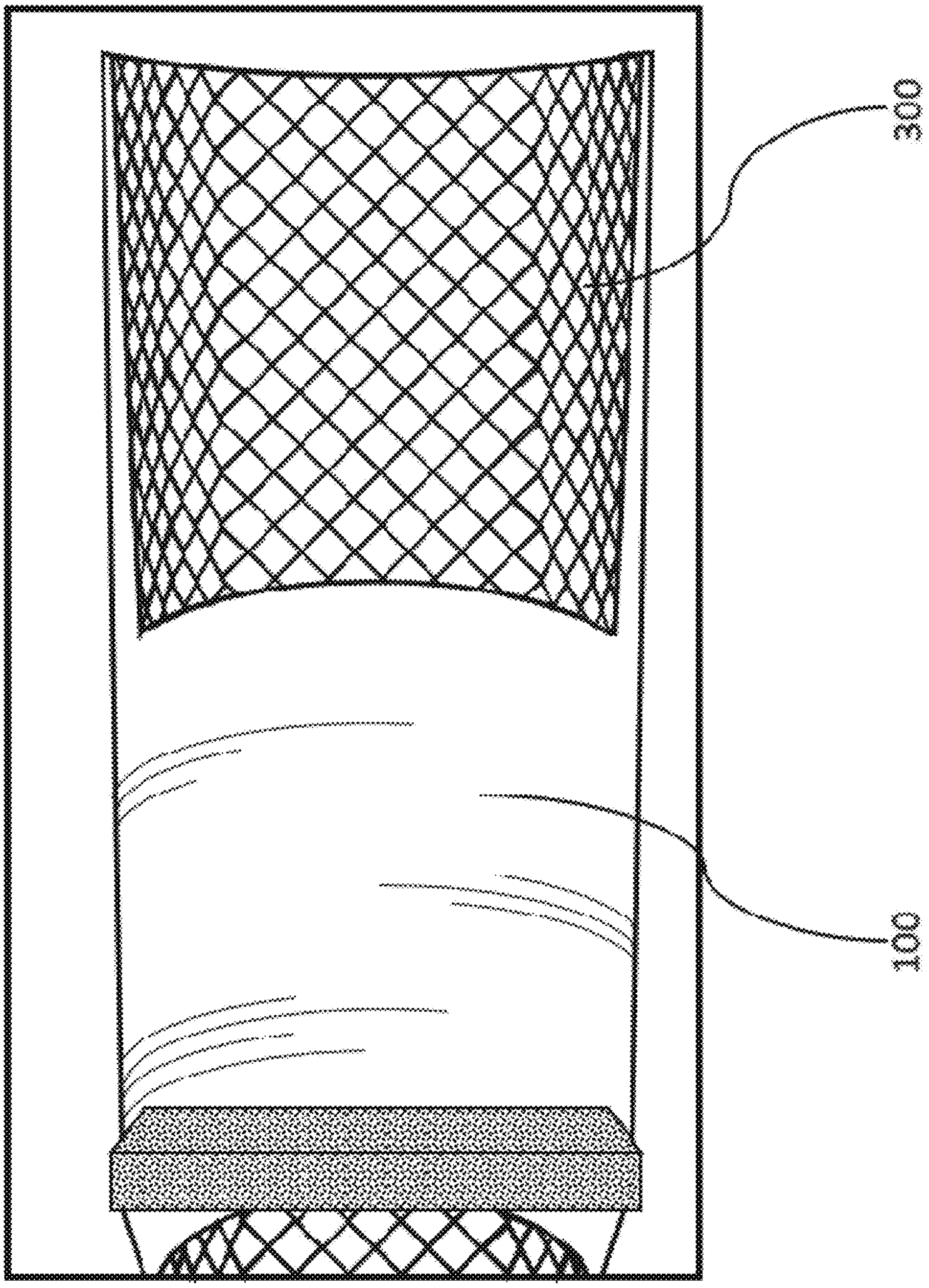
FIG. 19 is a diagram illustrating a rigid tubular structure being covered on the inside by a sound-absorptive material, in accordance with an example of inventive practice.

The present inventor also conducted experiments with respect to particular embodiments of his invention. Preliminary finite element simulations of an inventive design were sufficiently successful in demonstrating directionality and provided the confidence to build the first actual prototype of the present invention. The present inventor purchased at a local hardware store an eight-inch diameter, five-foot long steel tube such as may be used in a home's HVAC system. This rigid tube provided structural rigidity as well as line-of-sight directionality. Acoustic foam was chosen to provide the necessary attenuation. This inventive prototype also included some discarded egg-crate packing foam. FIG. 19 illustrates an inventive example of foam installation within a rigid tube. As shown in FIG. 19, the internal surface of the rigid tube was covered with this acoustic foam.

The present inventor's experience in testing the inventive prototype was difficult to describe in terms of the sensation of placing one's ear at the end of the prototype inventive tubular device, but it seemed to well transcend that of an acoustic anechoic chamber. The present inventor considered making a parabolic reflector but decided to order equipment online. The commercially available parts that the present inventor purchased for making his inventive prototype cost less than $100 total. After final assembly, a parametric checkout of the inventive sensor's ability to localize broadband sources (two fountains on a pond) was conducted. The present inventor compared the bare microphone with the parabolic dish, and lastly with the tube installed. Broadband directionality was clearly visible.

After the initial checkout, several tonal experiments were conducted, particularly at 5, 10, and 20 kHz. The inventive tube remained stationary while the present inventor shifted the tonal source to various azimuthal locations. A purpose of each of the main components of the inventive macriaphone is manifest in FIG. 17. Shown in FIG. 17, by way of example, is an inventive macriaphone as compared to a parabolic reflector and a bare microphone. A takeaway from FIG. 17 is the sharpness of the primary lobe, as compared to the parabolic microphone.

Figure 17:
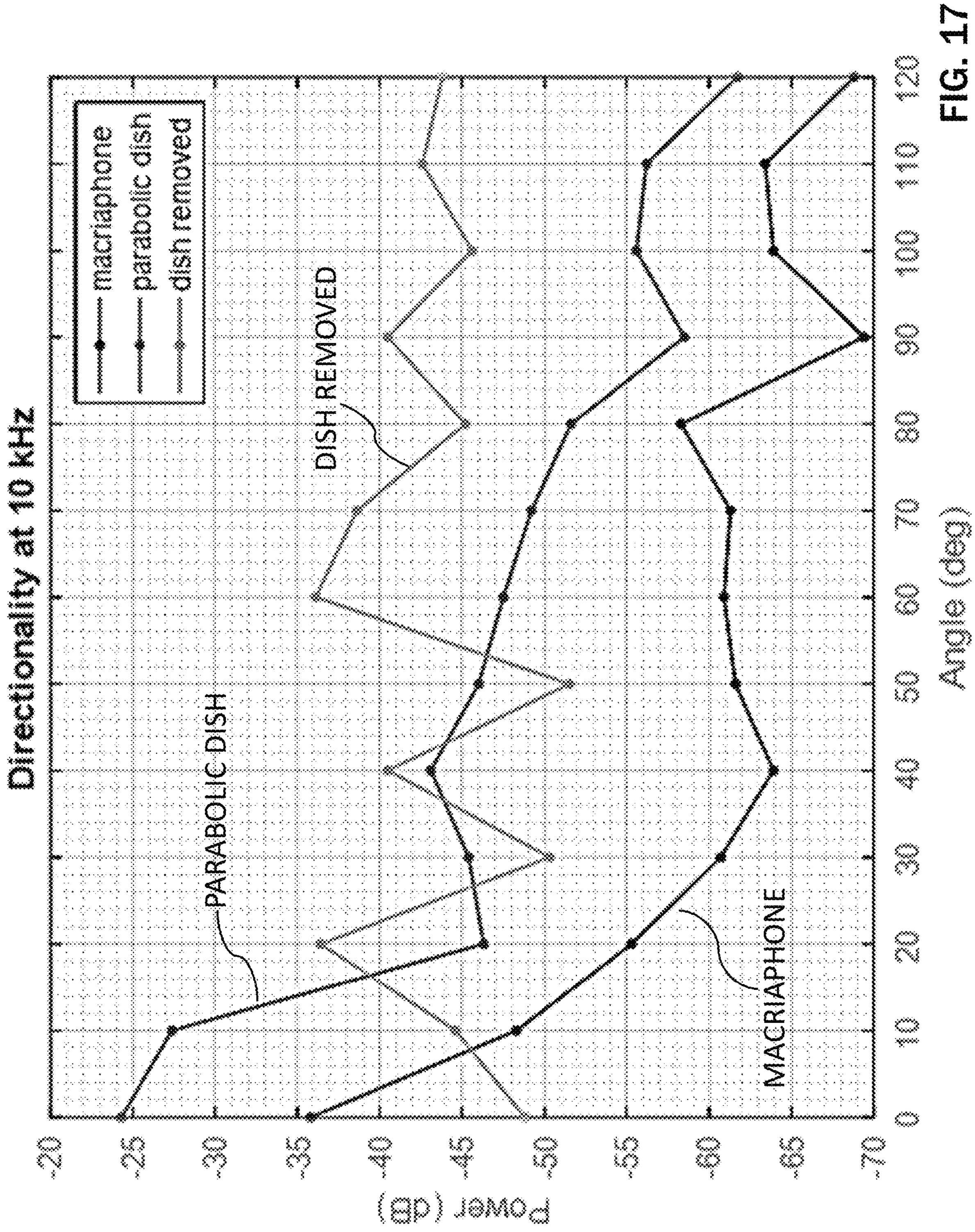
FIG. 17 is a graph illustrating, by way of example, power versus angle with respect to an embodiment of an inventive acoustic sensing device, in comparison with a parabolic dish or a bare microphone.
Figure 18:
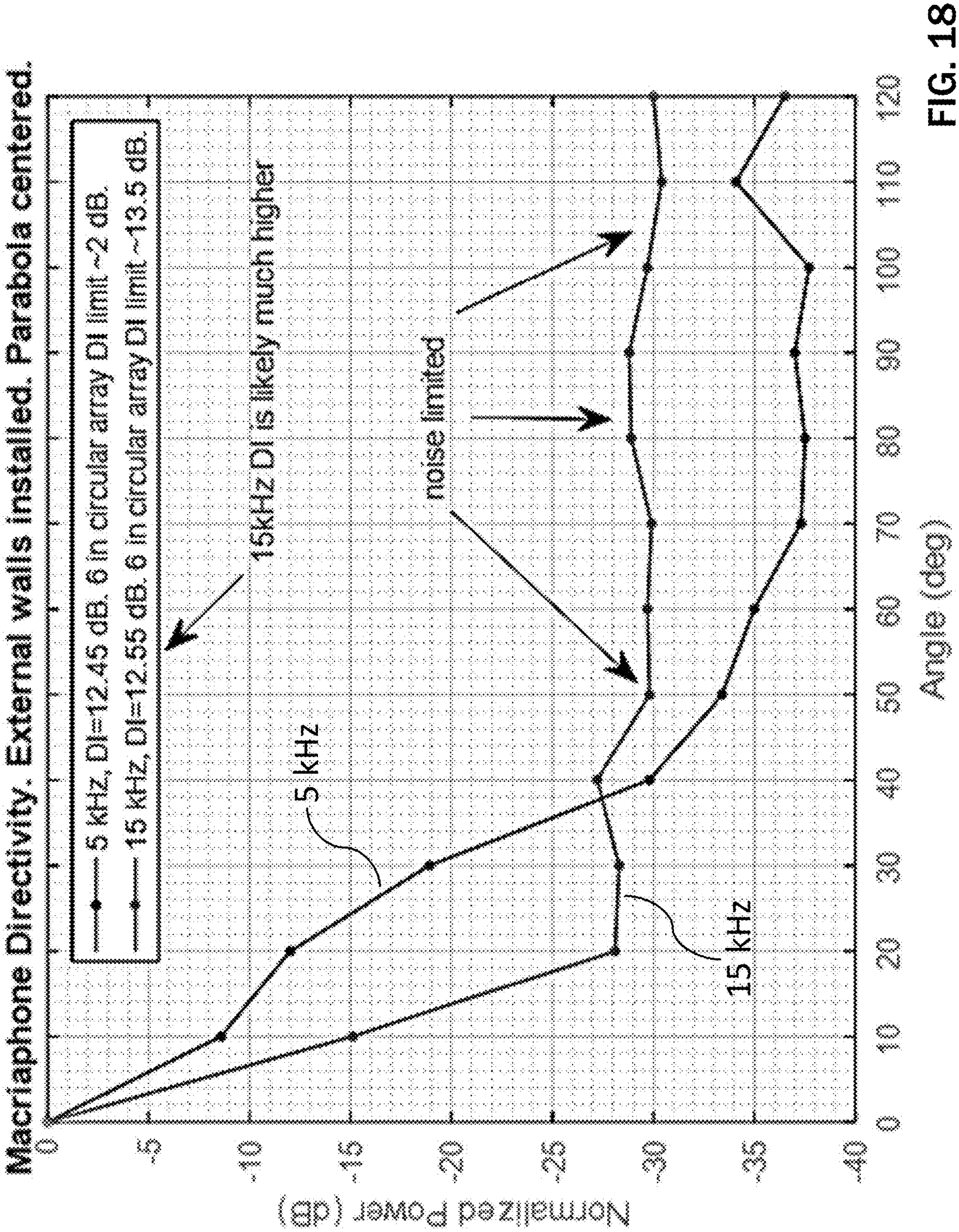
FIG. 18 is a graph illustrating, by way of example, directivity of an embodiment of an inventive acoustic sensing device.

FIG. 17 also indicates that past 40 degrees direct sound was received, incident from behind the tube. To prevent this the present inventor installed foam sidewalls surrounding the end of the tube, the parabolic reflector and aft. FIG. 18 shows macriaphone directivity at 5 and 15 kHz, and demonstrates the result of this improvement rendered by the present inventor. The measured directivity index is 12.5 dB at 5 kHz, which rivals the best shotgun microphone. For reference, a cardioid microphone has a DI of about 4 dB. The present inventor also compared the performance of this inventive sensor to beamforming DI limits of a 6-inch aperture circular array. For its aperture, the inventive sensor significantly outperforms conventional beamformers at lower frequencies. Chirp waveforms have been recorded and are being analyzed.

Figure 20:
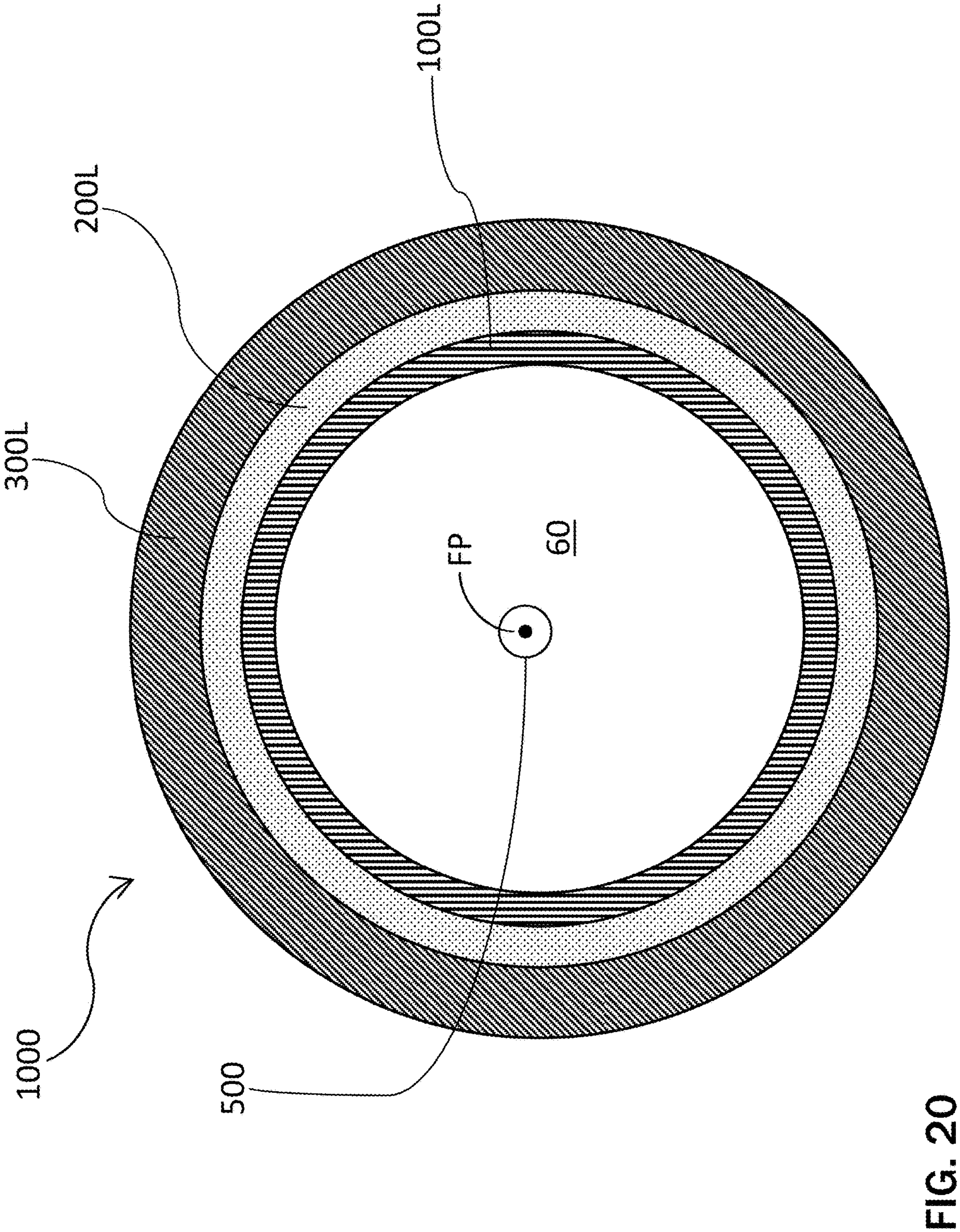
FIGS. 20 through 26 are diagrams, similar in view to FIGS. 4 and 8, illustrating various other examples of material configurations of an inventive acoustic sensing device, particularly with regard to presence and placement of one or more sound-absorptive layers and/or one or more vibration-absorptive layers.
Figure 21:
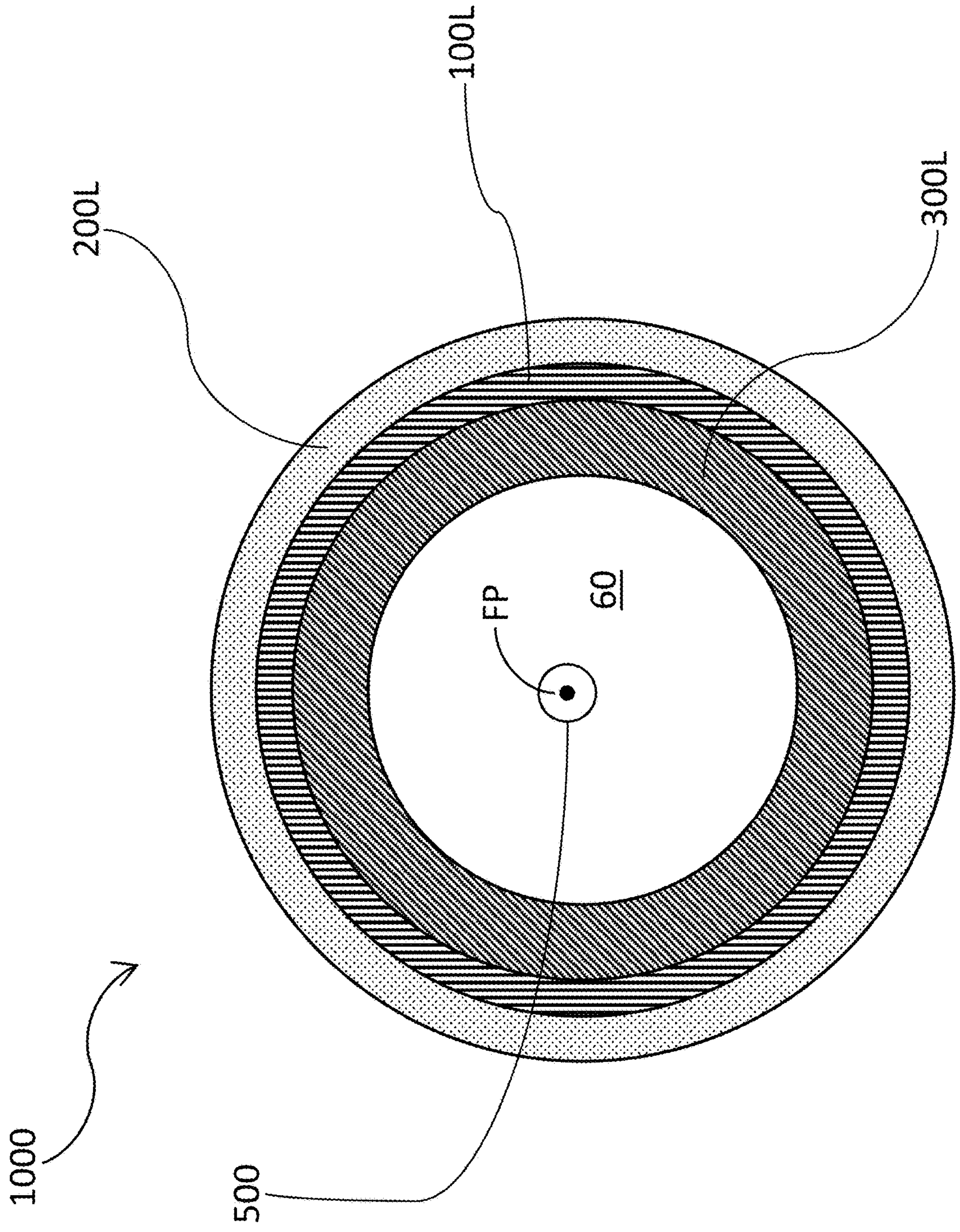
Figure 22:
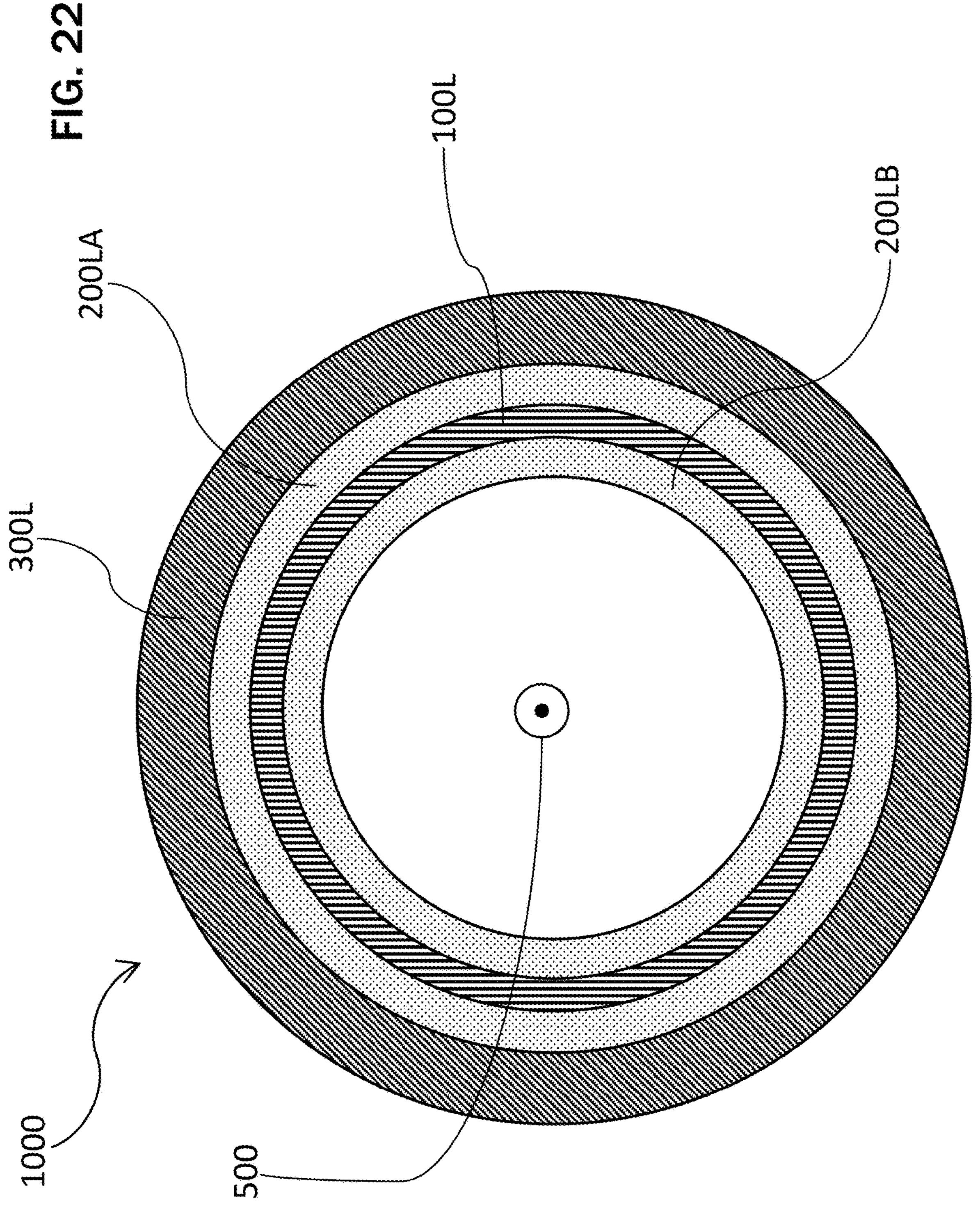
Figure 23:
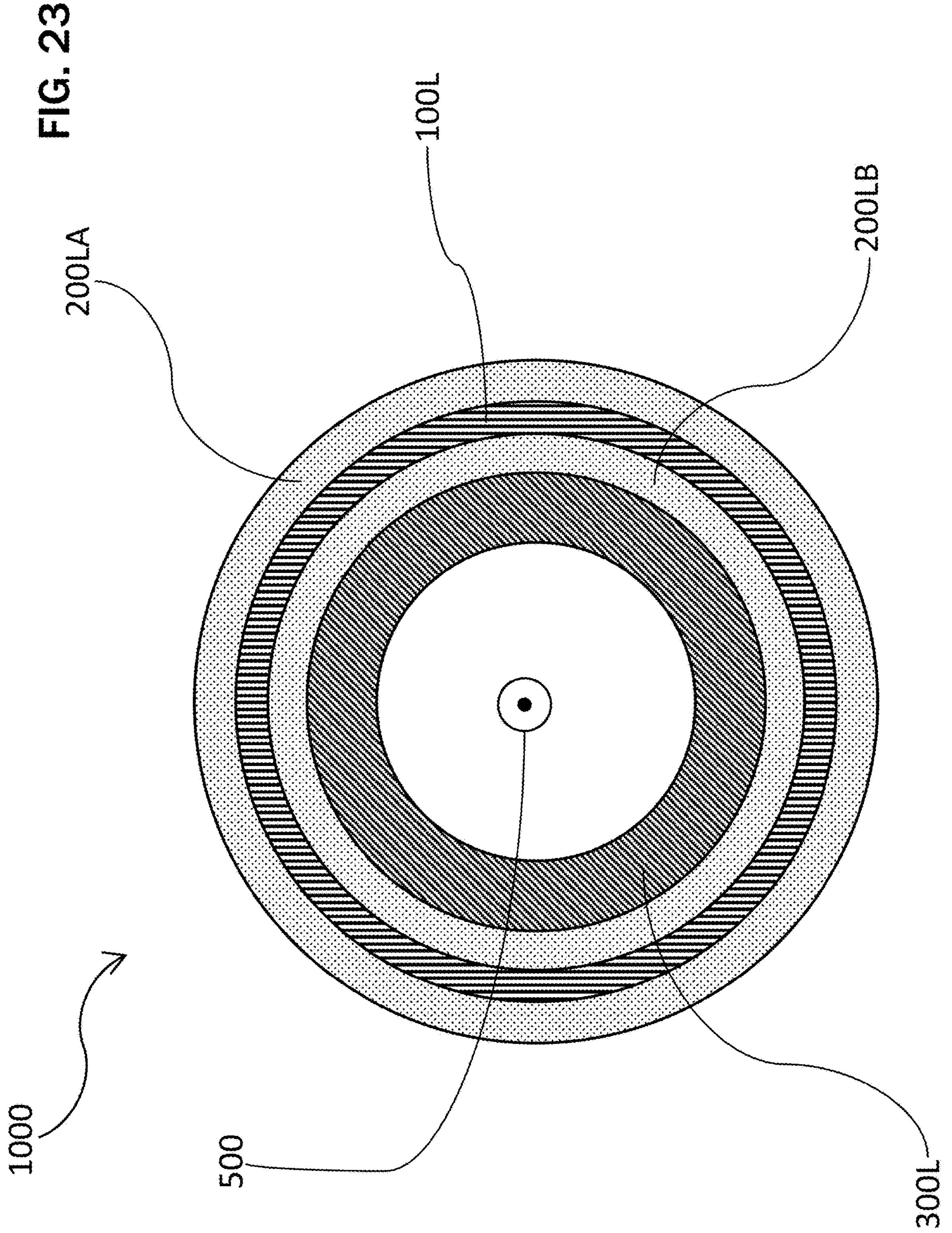

Now referring to FIGS. 20 through 26, multifarious configurations of materials and material layers are possible in accordance with inventive practice. FIG. 20 shows an exemplary inventive embodiment including one vibration-absorptive layer and one sound-absorptive layer (on the outside) along the inventive tubular device length. FIG. 21 shows an exemplary inventive embodiment including one vibration-absorptive layer and one sound-absorptive layer (on the inside) along the inventive tubular device length. FIG. 22 shows an exemplary inventive embodiment including two vibration-absorptive layers and one sound-absorptive layer (on the outside) along the inventive tubular device length. FIG. 23 shows an exemplary inventive embodiment including two vibration-absorptive layers and one sound-absorptive layer (on the inside) along the inventive tubular device length.

Figure 24:
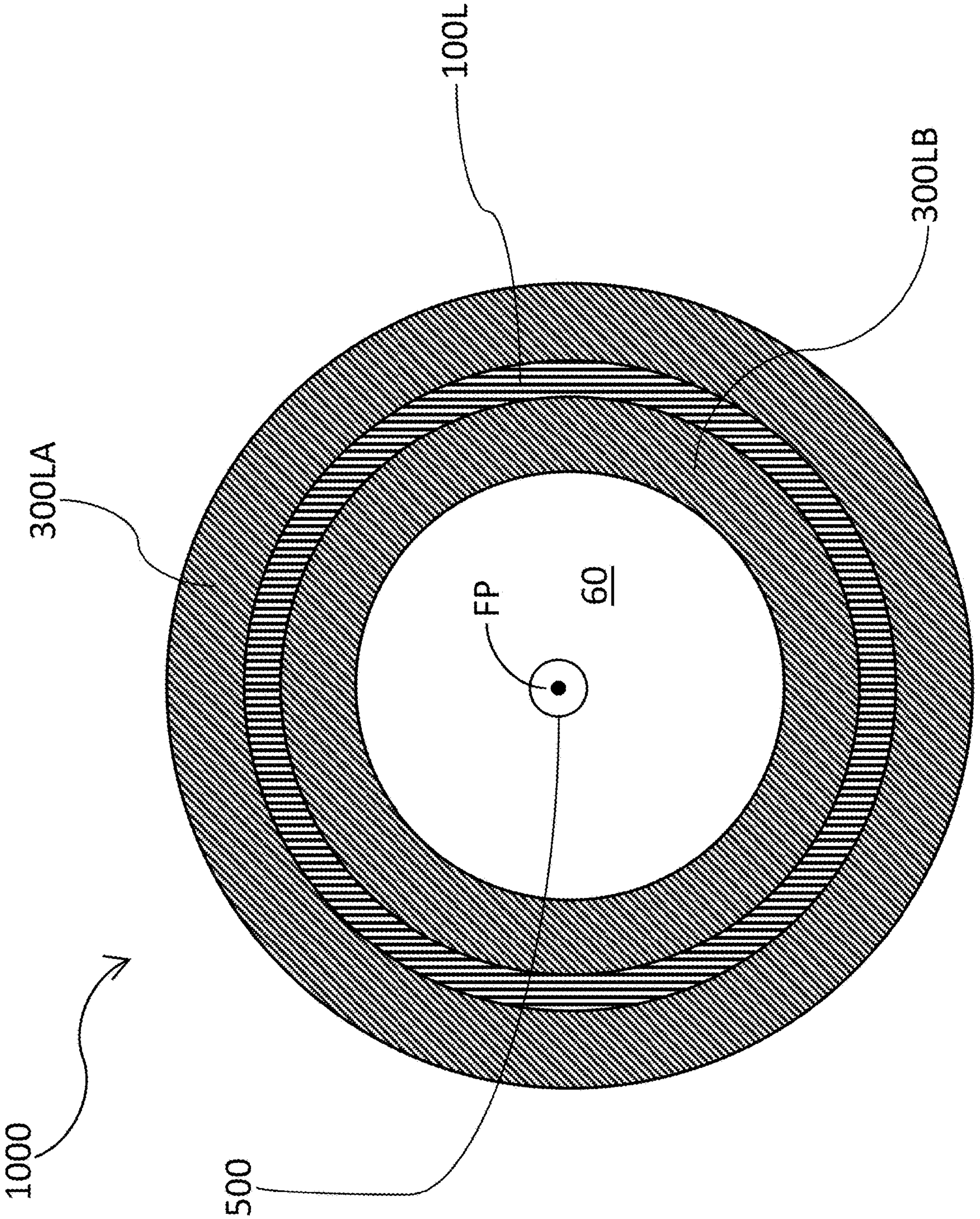
Figure 25:
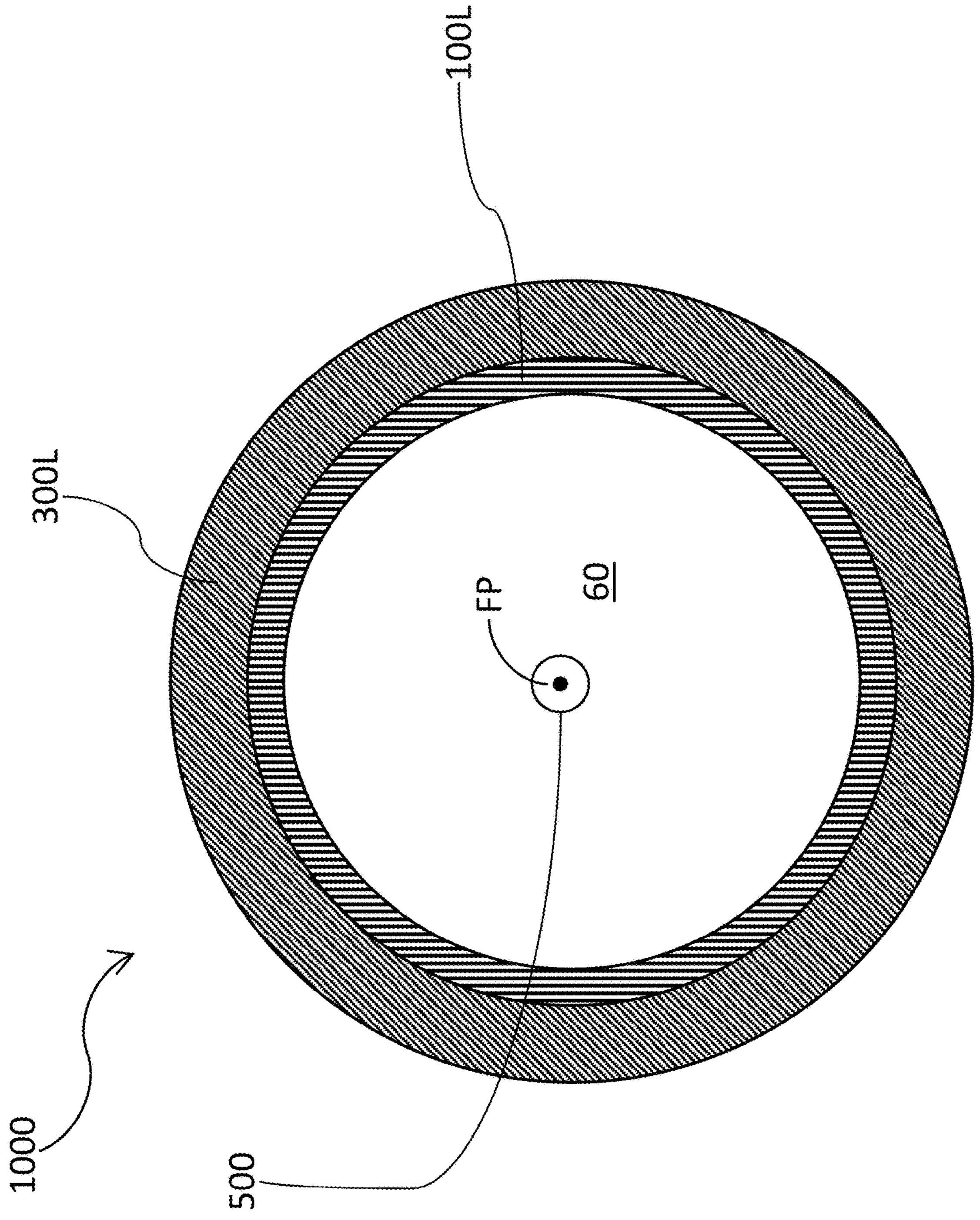
Figure 26:
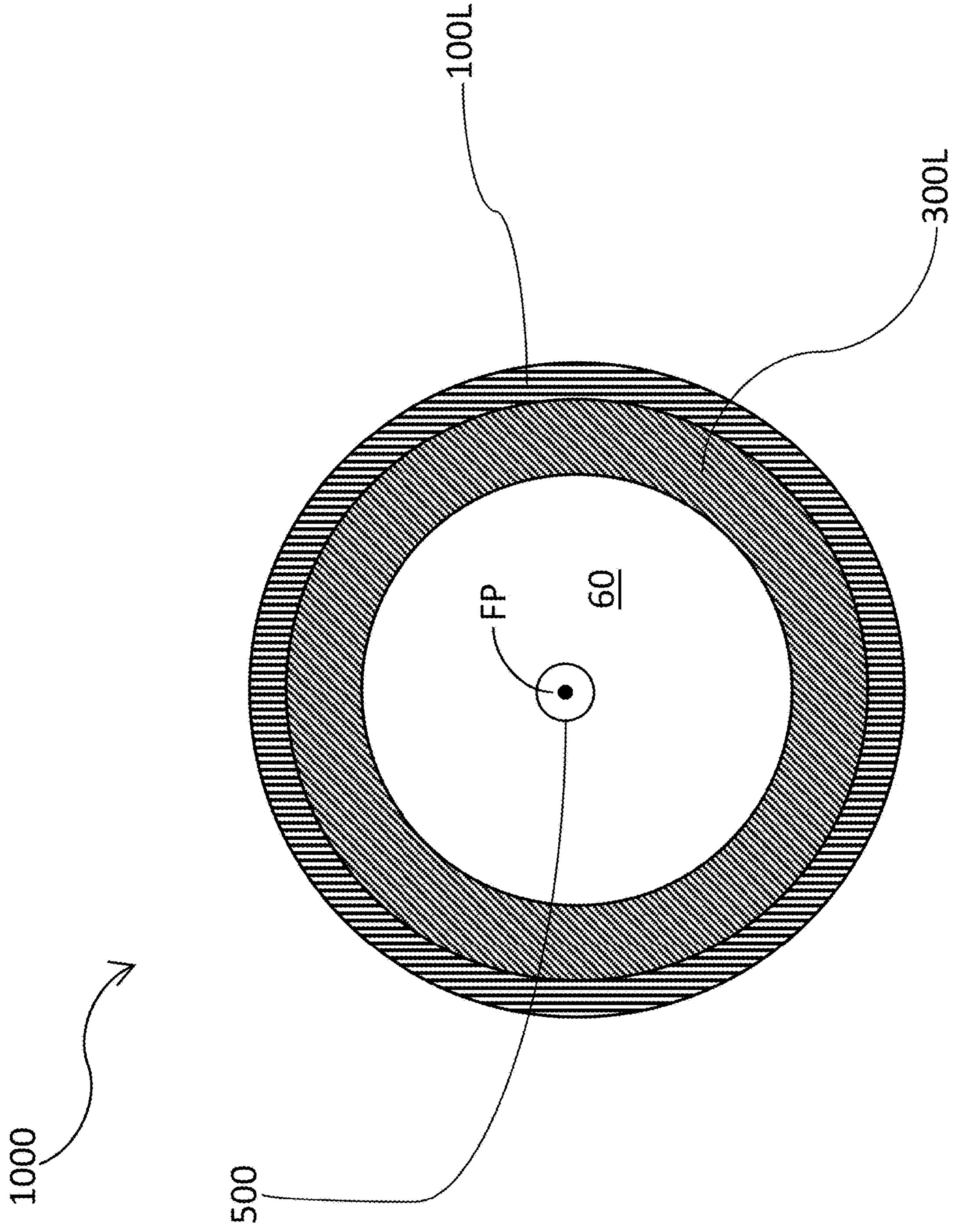

FIGS. 24 through 26 show three exemplary inventive embodiments that each include at least one sound-absorptive layer but no vibration-absorptive layer. FIG. 24 shows an exemplary inventive embodiment including two sound-absorptive layers (on the outside and inside, respectively) along the inventive tubular device length. FIG. 25 shows an exemplary inventive embodiment including one sound-absorptive layer (on the outside) along the inventive tubular device length. FIG. 26 shows an exemplary inventive embodiment including one sound-absorptive layer (on the inside) along the inventive tubular device length. FIGS. 24 through 26 are representative of a mode of inventive practice that does not include a vibration-absorptive layer along the length of the inventive tubular device. The inventive example partially depicted in FIG. 19 is akin to the inventive example shown in FIG. 26.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. An acoustic sensing device, comprising:

a rigid tubular structure characterized by a geometric longitudinal axis and an interior space, said rigid tubular structure including a cylindrical section, an open axial end, and a closed axial end, said cylindrical section having a cylinder inside and a cylinder outside, said closed axial end having an end outside and an end inside, said end inside having an acoustically reflective parabolic surface that is exposed to said interior space and is centrically aligned with respect to said geometric longitudinal axis;

at least one absorptive layer, each said absorptive layer made of at least one material selected from the group consisting of sound-absorptive material and vibration-absorptive material, at least one said absorptive layer at least substantially covering one of said cylindrical inside and said cylindrical outside;

a microphone situated in said interior space at a focal point of said acoustically reflective parabolic surface, said focal point located on said geometrical longitudinal axis, said microphone being capable of receiving sound waves that are focused upon said microphone by said acoustically reflective parabolic surface;

wherein a combination including said rigid tubular structure and said at least one absorptive layer promotes directivity of the acoustic sensing device.

2. The acoustic sensing device of claim 1, wherein said microphone is one of an omni-directional microphone and a cardioid microphone.

3. The acoustic sensing device of claim 1, wherein said at least one absorptive layer includes at least one said absorptive layer made of sound-absorptive material.

4. The acoustic sensing device of claim 1, wherein said at least one absorptive layer includes at least one said absorptive layer made of vibration-absorptive material.

5. The acoustic sensing device of claim 1, wherein said at least one absorptive layer includes at least one said absorptive layer made of sound-absorptive material and at least one said absorptive layer made of vibration-absorptive material.

6. The acoustic sensing device of claim 1, wherein at least one said absorptive layer at least substantially covers said end outside.

7. The acoustic sensing device of claim 6, wherein said at least one absorptive layer includes at least one said absorptive layer made of sound-absorptive material and at least one said absorptive layer made of vibration-absorptive material.

8. The acoustic sensing device of claim 6, wherein:

said cylindrical section of said rigid tubular structure guides sound waves toward said acoustically reflective parabolic surface, said cylindrical section thereby increasing incidence of on-axis sound waves upon said acoustically reflective parabolic surface;

said at least one absorptive layer attenuates sound waves that interact with said rigid tubular structure, said at least one absorptive layer thereby decreasing receipt of off-axis sound waves by said microphone.

9. The acoustic sensing device of claim 8, wherein said at least one absorptive layer includes at least one said absorptive layer made of sound-absorptive material and at least one said absorptive layer made of vibration-absorptive material.

10. The acoustic sensing device of claim 8, wherein said sound waves that interact with said rigid tubular structure are at least one kind of sound waves selected from the group consisting of:

sound waves that are diffracted by at least one edge at said open axial end;

sound waves that are transmitted through said rigid tubular structure and into said interior space; and sound waves that enter said interior space at said open axial end and are reflected off said cylinder inside.

11. The acoustic sensing device of claim 10, wherein said at least one absorptive layer includes at least one said absorptive layer made of sound-absorptive material and at least one said absorptive layer made of vibration-absorptive material.

12. The acoustic sensing device of claim 1, wherein:

said cylindrical section of said rigid tubular structure guides sound waves toward said acoustically reflective parabolic surface, said cylindrical section thereby increasing incidence of on-axis sound waves upon said acoustically reflective parabolic surface;

said at least one absorptive layer attenuates sound waves that interact with said rigid tubular structure, said at least one absorptive layer thereby decreasing receipt of off-axis sound waves by said microphone.

13. The acoustic sensing device of claim 12, wherein said sound waves that interact with said rigid tubular structure are at least one kind of sound waves selected from the group consisting of:

sound waves that are diffracted by at least one edge at said open axial end;

sound waves that are transmitted through said rigid tubular structure and into said interior space; and sound waves that enter said interior space at said open axial end and are reflected off said cylinder inside.

14. The acoustic sensing device of claim 13, wherein said at least one absorptive layer includes at least one said absorptive layer made of sound-absorptive material and at least one said absorptive layer made of vibration-absorptive material.

15. A sound sensing apparatus comprising a waveguide, an anechoic material, a parabolic reflector, and a microphone, wherein:

said waveguide has a longitudinal axis, an open axial end, and a closed axial end;

said anechoic material adjoins said waveguide;

said parabolic reflector is positioned at said closed axial end and is characterized by a focal point;

said microphone is positioned at said focal point;

said waveguide guides, in an axial direction, acoustic waves that enter said waveguide at said open end and do not contact said waveguide;

said anechoic material mitigates acoustic waves that contact said waveguide;

said guidance of acoustic waves results in a greater amount of axially directed acoustic waves that are reflected by said parabolic reflector and accordingly are detected by said microphone;

said mitigation of acoustic waves results in a lesser amount of non-axially directed acoustic waves that are detected by said microphone.

16. The sound sensing apparatus of claim 15, wherein said greater amount of axially directed acoustic waves and said lesser amount of non-axially directed acoustic waves, in combination, are associated with a higher directivity of said sound sensing apparatus.

17. The sound sensing apparatus of claim 15, wherein:

said waveguide is a cylindrical waveguide;

said anechoic material includes at least one of a sound-absorbing material and a vibration-absorbing material.

18. A method for sensing sound, the method comprising:

adjoining an anechoic material to a waveguide, said waveguide having a longitudinal axis, an open axial end, and a closed axial end;

positioning a parabolic reflector at said closed axial end, said parabolic reflector characterized by a focal point;

positioning a microphone at said focal point;

aiming said waveguide, wherein:

said waveguide guides, in an axial direction, acoustic waves that enter said waveguide at said open axial end and do not contact said waveguide;

said guidance of acoustic waves results in a greater amount of axially directed acoustic waves that are reflected by said parabolic reflector and accordingly are detected by said microphone;

said anechoic material mitigates acoustic waves that contact said waveguide;

said mitigation of acoustic waves results in a lesser amount of non-axially directed acoustic waves that are detected by said microphone.

19. The method for sensing sound as recited in claim 18, wherein said greater amount of axially directed acoustic waves and said lesser amount of non-axially directed acoustic waves, in combination, are associated with a higher directivity of said sound sensing apparatus.

20. The method for sensing sound as recited in claim 18, wherein:

said waveguide is a cylindrical waveguide;

said anechoic material includes at least one of a sound-absorbing material and a vibration-absorbing material.

* * * * *